(12) United States Patent
Long et al.

(10) Patent No.: US 11,868,279 B2
(45) Date of Patent: *Jan. 9, 2024

(54) HIGH DENSITY PERIPHERAL CARD CHASSIS

(71) Applicant: Liqid Inc., Broomfield, CO (US)

(72) Inventors: Christopher R. Long, Colorado Springs, CO (US); Andrew Rudolph Heyd, Longmont, CO (US); Brenden Rust, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,430

(22) Filed: Sep. 26, 2022

(65) Prior Publication Data

US 2023/0016542 A1 Jan. 19, 2023

Related U.S. Application Data

(63) Continuation of application No. 17/506,100, filed on Oct. 20, 2021, now Pat. No. 11,531,629.
(Continued)

(51) Int. Cl.
*G06F 13/10* (2006.01)
*G06F 13/42* (2006.01)
(Continued)

(52) U.S. Cl.
CPC ........ *G06F 13/102* (2013.01); *G06F 13/4022* (2013.01); *G06F 13/4221* (2013.01)

(58) Field of Classification Search
CPC . G06F 13/102; G06F 13/4022; G06F 13/4221
(Continued)

(56) References Cited

U.S. PATENT DOCUMENTS 8,756,360 B1 6/2014 Richard
9,223,737 B1 12/2015 Serebrin
(Continued)

OTHER PUBLICATIONS

"GigaIO AIC Resource Box—Disaggregated Compute Accelerator for Deep Learning and HPC"; https://gigaio.com/wp-content/uploads/2020/09/GIO_AIC_ResourceBox.V2.0.pdf; Sep. 15, 2020; 1 page.
(Continued)

*Primary Examiner* — Christopher B Shin

(57) ABSTRACT

Designs for a rackmount chassis having multiple card slots are presented herein. In one example, an apparatus includes a chassis configured to mount into a server rack, including a plurality of peripheral card slots, and a plurality of status lights configured to provide indications of operational status for an associated slot. The chassis further includes switch circuitry, including at least three switch elements, configured to couple the slots, wherein a first portion of ports on each of the switch elements is coupled to corresponding slots, a second portion of the ports on each of the switch elements is coupled to external ports of the chassis, and a third portion of the ports on each of the switch elements is coupled to at least another among the switch elements. The chassis may further include a plurality of external ports on the chassis communicatively coupled to the slots through the switch circuitry.

20 Claims, 11 Drawing Sheets

Related U.S. Application Data

(60) Provisional application No. 63/156,749, filed on Mar. 4, 2021, provisional application No. 63/156,751, filed on Mar. 4, 2021.

(51) Int. Cl.
*G06F 13/40* (2006.01)
*G06F 13/00* (2006.01)

(58) Field of Classification Search
USPC .......................................................... 710/62
See application file for complete search history.

(56) References Cited

U.S. PATENT DOCUMENTS

| | | | |
|---|---|---|---|
| 9,668,371 | B1 | 5/2017 | Strmiska et al. |
| 9,678,910 | B2 | 6/2017 | Breakstone et al. |
| 9,684,575 | B2 | 6/2017 | Breakstone et al. |
| 9,870,333 | B1 | 1/2018 | Lam et al. |
| 10,180,924 | B2 | 1/2019 | Breakstone et al. |
| 10,206,297 | B2 * | 2/2019 | Breakstone ......... G06F 13/4282 |
| 10,255,215 | B2 * | 4/2019 | Breakstone ............ G06F 13/16 |
| 10,592,291 | B2 | 3/2020 | Breakstone et al. |
| 11,044,539 | B1 * | 6/2021 | Marshall ............ H04Q 11/0066 |
| 11,055,252 | B1 | 7/2021 | Constantinides et al. |
| 11,294,839 | B2 * | 4/2022 | Long ................... G06F 13/4022 |
| 2004/0032961 | A1 | 2/2004 | Terada et al. |
| 2007/0136504 | A1 | 6/2007 | Wu |
| 2008/0317025 | A1 | 12/2008 | Manula et al. |
| 2013/0031288 | A1 | 1/2013 | Richard |
| 2014/0365698 | A1 | 12/2014 | Richard et al. |
| 2015/0261710 | A1 | 9/2015 | Billi |
| 2015/0309952 | A1 | 10/2015 | Breakstone et al. |
| 2015/0370665 | A1 | 12/2015 | Cannata et al. |
| 2015/0373115 | A1 | 12/2015 | Breakstone et al. |
| 2016/0062433 | A1 | 3/2016 | York |
| 2016/0073544 | A1 * | 3/2016 | Heyd ...................... G06F 1/185 |
| | | | 361/679.31 |
| 2016/0224497 | A1 | 8/2016 | Hartman et al. |
| 2016/0321012 | A1 | 11/2016 | Clark et al. |
| 2016/0321200 | A1 * | 11/2016 | Long ..................... G06F 3/0619 |
| 2017/0046293 | A1 | 2/2017 | Lasater |
| 2017/0134223 | A1 | 5/2017 | Ahmed et al. |
| 2017/0150621 | A1 | 5/2017 | Breakstone et al. |
| 2017/0172007 | A1 | 6/2017 | Itkin et al. |
| 2017/0220505 | A1 * | 8/2017 | Breakstone ......... G06F 13/4282 |
| 2017/0228339 | A1 | 8/2017 | Shao et al. |
| 2017/0235347 | A1 | 8/2017 | Heyd et al. |
| 2017/0357609 | A1 * | 12/2017 | Long ................... G06F 13/4282 |
| 2018/0046514 | A1 * | 2/2018 | Breakstone ........... G06F 3/0482 |
| 2018/0074993 | A1 | 3/2018 | Buckland et al. |
| 2018/0101500 | A1 | 4/2018 | Heyd et al. |
| 2018/0260352 | A1 * | 9/2018 | Long ...................... G06F 1/266 |
| 2018/0314667 | A1 | 11/2018 | Long et al. |
| 2019/0012288 | A1 | 1/2019 | Zhao et al. |
| 2019/0306083 | A1 | 10/2019 | Shih et al. |
| 2020/0045843 | A1 | 2/2020 | Schramm et al. |
| 2020/0278733 | A1 | 9/2020 | Li et al. |
| 2021/0004342 | A1 | 1/2021 | Singer et al. |
| 2021/0100127 | A1 | 4/2021 | Farrahi et al. |
| 2022/0038391 | A1 * | 2/2022 | Frankel ................... H04L 49/15 |

OTHER PUBLICATIONS

"GigaIO Gen4 Accelerator Pooling Appliance—Fully Managed Disaggregated Compute Accelerator Appliance for AI/DL, HPC, Visualization and Data Science Applications"; https://gigaio.com/wp-content/uploads/2020/11/Hydra-V11.0.pdf; Nov. 16, 2020; 2 pages.

International Search Report and Written Opinion for PCT Application No. PCT/US2022/017259, dated May 3, 2022; 16 pages.

International Search Report and Written Opinion for PCT Application No. PCT/US2022/017265, dated Jun. 21, 2022; 12 pages.

* cited by examiner

HIGH DENSITY PERIPHERAL CARD CHASSIS

RELATED APPLICATIONS

This application is a continuation of, and claims priority to, U.S. patent application Ser. No. 17/506,100, entitled "HIGH DENSITY PERIPHERAL CARD CHASSIS," and filed Oct. 20, 2021. This application hereby claims the benefit of and priority to U.S. Provisional Patent Application 63/156,750, titled "HIGH PERFORMANCE COMPUTING SYSTEM," filed Mar. 4, 2021; to U.S. Provisional Patent Application 63/156,751, titled "POWER CONTROL FOR PCIe SLOTS," filed Mar. 4, 2021; and to U.S. Provisional Patent Application 63/156,749, titled "GPU SWITCH CHASSIS," filed Mar. 4, 2021, the contents of which are hereby incorporated by reference in their entirety.

BACKGROUND

Clustered computing systems have become popular as demand for data storage, data processing, and communication handling has increased. Data centers typically include large rack-mounted and network-coupled data storage and data processing systems. Many times, data centers and associated computing equipment can be employed to execute jobs for multiple concurrent users or applications. The jobs include execution jobs which can utilize resources of a data center to process data using central processing units (CPUs) or graphics processing units (GPUs), as well as to route data associated with these resources between temporary and long-term storage, or among various network locations. GPU-based processing has increased in popularity for use in artificial intelligence (AI) and machine learning regimes. In these regimes, computing systems, such as blade servers, can include one or more GPUs along with associated CPUs for processing of large data sets. A blade server with a plurality of GPUs may be referred to as a JBOGs (Just a bunch (or box) of GPUs).

Many existing JBOGs fall short in a number of performance areas. Individual slots, such as Peripheral Component Interconnect Express (PCIe) ports into which GPU cards can be inserted, are not power protected. Individual GPUs or peripheral cards cannot be live serviced while the rest of the GPUs in the JBOG chassis remain powered on and running, and require powering down the entire unit or chassis to replace or service failed cards. Hard reset is available via OOB (out of band) signaling. The units don't allow for power cycling to recover from card failures, and some failing GPUs can cause the whole system to hang. Furthermore, units do not provide indicators of which individual card has failed and require removal of one card at a time until the failed card is discovered.

Overview

Designs for a rackmount chassis having multiple card slots are presented herein. In one example, an apparatus includes a chassis configured to mount into a server rack, including a plurality of expansion card slots, and a plurality of status lights, each status light corresponding to one of the plurality of expansion card slots, configured to provide indications of operational status for a peripheral card inserted into an associated expansion card slot. The chassis further includes communication switch circuitry including at least three communication switch elements, the communication switch circuitry configured to couple the expansion card slots, wherein a first portion of ports on each of the three communication switch elements is coupled to corresponding expansion card slots, a second portion of the ports on each of the three communication switch elements is coupled to external ports of the chassis, and a third portion of the ports on each of the three communication switch elements is coupled to at least another among the three communication switch elements. The chassis may further include a plurality of external ports on the chassis communicatively coupled to the expansion card slots through the communication switch circuitry.

In one example, a method includes providing a plurality of expansion card slots within a chassis, and providing status lights for each slot configured to provide indications of operational status for peripheral cards inserted into associated expansion card slots. The method further includes coupling the plurality of expansion card slots via communication switch circuitry including at least three communication switch elements, wherein a first portion of ports on each of the three communication switch elements is coupled to corresponding expansion card slots, wherein a second portion of the ports on each of the three communication switch elements is coupled to external ports of the chassis, and wherein a third portion of the ports on each of the three communication switch elements is coupled to at least another among the three communication switch elements. The method further includes providing a plurality of external ports on the chassis communicatively coupled to the expansion card slots through the communication switch circuitry.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
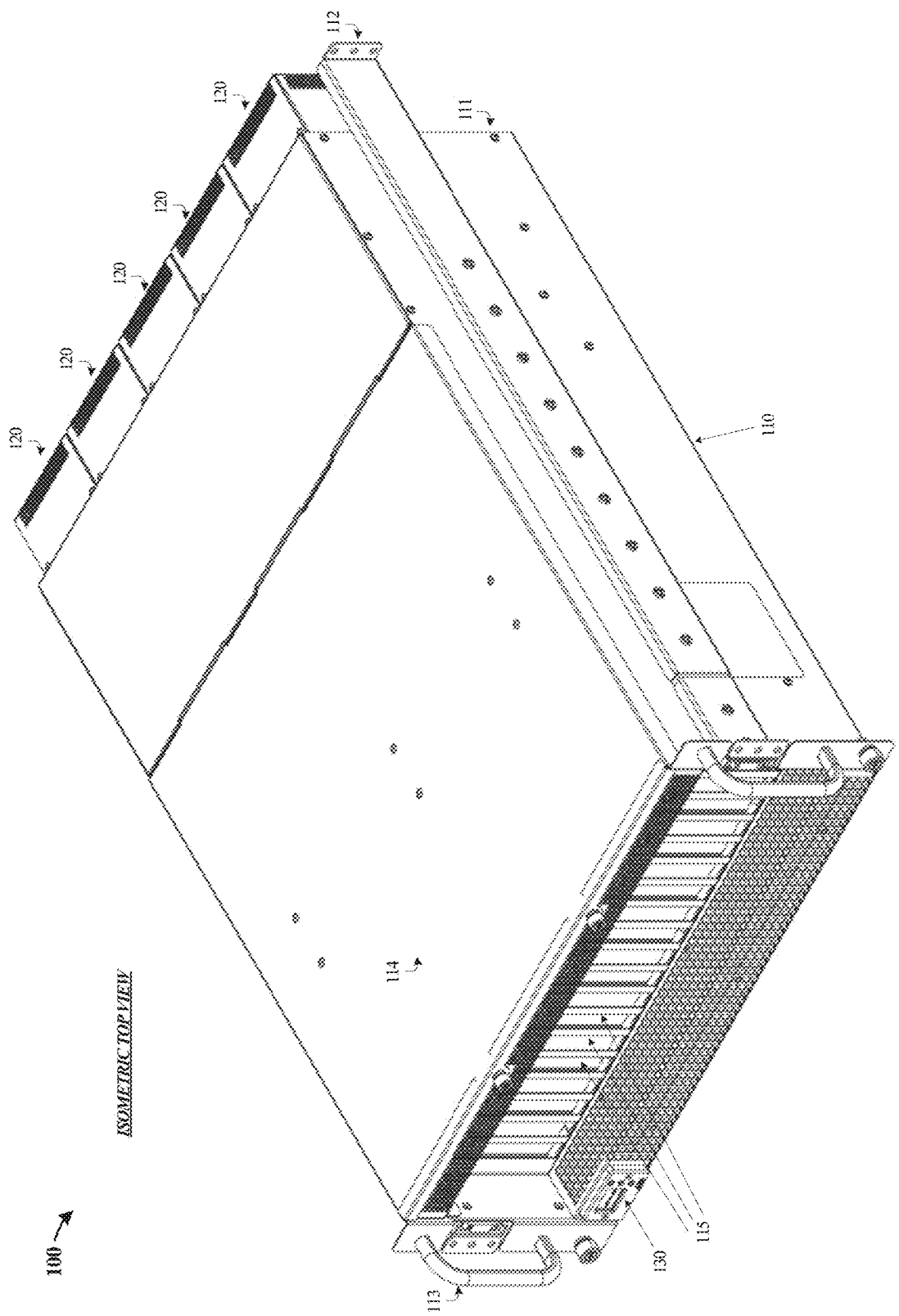
FIG. 1 is a diagram illustrating an isometric top view of a high density peripheral card chassis in an implementation.

Data processing has increased in popularity for use in a variety of fields, including artificial intelligence (AI) and machine learning regimes. Data processing centers can employ computing systems including one or more GPUs along with associated CPUs for processing of large data sets. The examples herein provide for enhanced computing systems, including rackmount chassis providing PCIe ports to hold a plurality of peripheral cards, such as GPUs. The chassis may provide PCIe fabric switching functionality, enabling communication between the peripheral cards directly without transferring the data through a PCIe root complex or host device, and further allowing the plurality of cards in the computing system to be integrated with an external PCIe fabric via external PCIe ports on the chassis. Further, the enhanced computing system may include status lights and indicators integrated into the chassis to provide operational statuses for the inserted peripheral cards. The enhanced computing system may allow for live swapping or hot swapping peripheral cards in the chassis without disconnecting or powering down the computing system or other cards in the chassis.

The design of the PCIe switch chassis computing system allows for dynamically composing groups of physical computing components into ad hoc or on-the-fly computing units. The physical components can be located in different chassis, different server racks, or even in different data centers, and can be organized and communicate over the PCIe switching fabric. Arrangements of physical computing components coupled over a communication fabric can be achieved by populating various peripheral card slots in a chassis with add-in cards that house such computing components. Various expansion ports are also included which allow coupling to further chassis and components. These cards and ports can be further coupled over the communication fabric to a baseboard which houses a plurality of co-processing unit (CoPU) or GPU devices which have separate cross-coupling on the baseboard. The components of the various computing systems herein can be included in one or more physical enclosures, such as rack-mountable modules which can further be included in shelving or rack units. A quantity of components can be inserted or installed into a physical enclosure or chassis, such as a modular framework where modules can be inserted and removed according to the needs of a particular end user. The chassis can include physical support structure and enclosure that includes circuitry, printed circuit boards, semiconductor systems, and structural elements. The modules that comprise the components of such as computing system may be insertable and removable from a rackmount style or rack unit (U) type of enclosure.

Discussed herein is a computing system chassis which may house various individual physical computing components coupled over one or more shared communication fabrics. Although the examples below employ PCIe as the exemplary communication fabric type, it should be understood that others can instead be used. PCIe is a high-speed serial computer expansion bus standard, and may enable point-to-point connections among hosts and component devices, or among peer devices. PCIe typically has individual serial links connecting every device to a root complex, also referred to as a host. A PCIe communication fabric can be established using various switching circuitry and control architectures described herein. A PCIe fabric might comprise various implementation versions, such as 3.0, 4.0, or 5.0, among others. Some additional signaling or protocol types may be built upon PCIe, and thus add additional features to PCIe interfaces.

Instead of a PCIe fabric, other point-to-point communication fabrics or communication buses with associated physical layers, electrical signaling, protocols, and layered communication stacks can be employed. These might include Gen-Z, Ethernet, InfiniBand, NVMe, Internet Protocol (IP), Serial Attached SCSI (SAS), FibreChannel, Thunderbolt, Serial Attached ATA Express (SATA Express), Cache Coherent Interconnect for Accelerators (CCIX), Compute Express Link (CXL), Open Coherent Accelerator Processor Interface (OpenCAPI), wireless Ethernet or Wi-Fi (802.11x), or cellular wireless technologies, among others. Ethernet can refer to any of the various network communication protocol standards and bandwidths available, such as 10BASE-T, 100BASE-TX, 1000BASE-T, 10GBASE-T (10GB Ethernet), 40GBASE-T (40GB Ethernet), gigabit (GbE), terabit (TbE), 200GbE, 400GbE, 800GbE, or other various wired and wireless Ethernet formats and speeds. Cellular wireless technologies might include various wireless protocols and networks built around the 3rd Generation Partnership Project (3GPP) standards including 4G Long-Term Evolution (LTE), 5G NR (New Radio) and related 5G standards, among others. Parallel, serial, or combined parallel/serial types of interfaces can also apply to the examples herein.

As a first example system, FIG. 1 is presented. FIG. 1 is a diagram illustrating an isometric top view of an example high density peripheral card chassis computing system 100. The system 100 may include a chassis frame or enclosure 110, which may be configured to insert or mount in a server rack unit. The chassis frame 110 may provide a modular framework into which computing components can be inserted and removed.

A mounting bracket or slide rail 112 may be affixed to the chassis 110. The rail 112 may include screw holes or other joining elements enabling the chassis 112 to be securely affixed to a server rack or shelf unit. Further, in examples having a ball or roller slide rail 112, it may enable the chassis 110 to be partially pulled out from the rack or shelf unit to provide easier access the components of the system 100 without entirely disconnecting the chassis 110 from the rack. Matching slide rails 112 may be affixed to opposite sides of the chassis 110 to provide additional support when sliding the chassis 110 into or out of a server rack. A handle 113 mounted to the chassis 110 may facilitate pulling the chassis 110 out of the rack using the slide rail 112, or carrying the system 100 when not inserted into a server rack.

The chassis 110 may include a removable top or lid 114, which may be secured in a closed position with thumb screws or other latching element. For example, the lid may be joined to the chassis 110 via a hinge, allowing the lid 114 to be opened up when the chassis 110 is pulled out of a server rack on slide rail 112. When the removable top 114 is opened, a user may access the peripheral slots, computing modules, and other components housed in the chassis 110.

A front panel of the chassis 110 may include a plurality of recesses, bays, or openings 115 to the peripheral card compartment of system 100. The recesses 115 may provide air flow, provide a view of indicator lights for the status of peripheral cards, and in some examples may enable cards to be inserted or removed directly through recesses 115.

System 100 may also include a status display 130, such as an OLED display which can provide indicators for the status of components of system 100. The status display 130 may tell an operator when to look inside (e.g. through opening 115 or removable top 114) at status indicators or LEDs for individual card slots, or otherwise indicate when to investigate or debug individual cards or slots. In some examples, the status display 130 can report issues on other chassis which are cross-coupled to system 100. The status display 130 may provide color coded errors or status indicators (e.g. via solid colors or blinking light), or the display 130 may provide text-based error or status indicators, such as displaying error codes. The status display 130 may also include one or more user input components, such as buttons, touchscreen, switches, dials, or similar inputs. The user inputs may allow for functions such as clearing or cycling through status indicators. In some examples, user input elements on the status display 130 may allow an operator to control other functions of system 100, such as shutting off power to one or more peripheral card slots.

Figure 2:
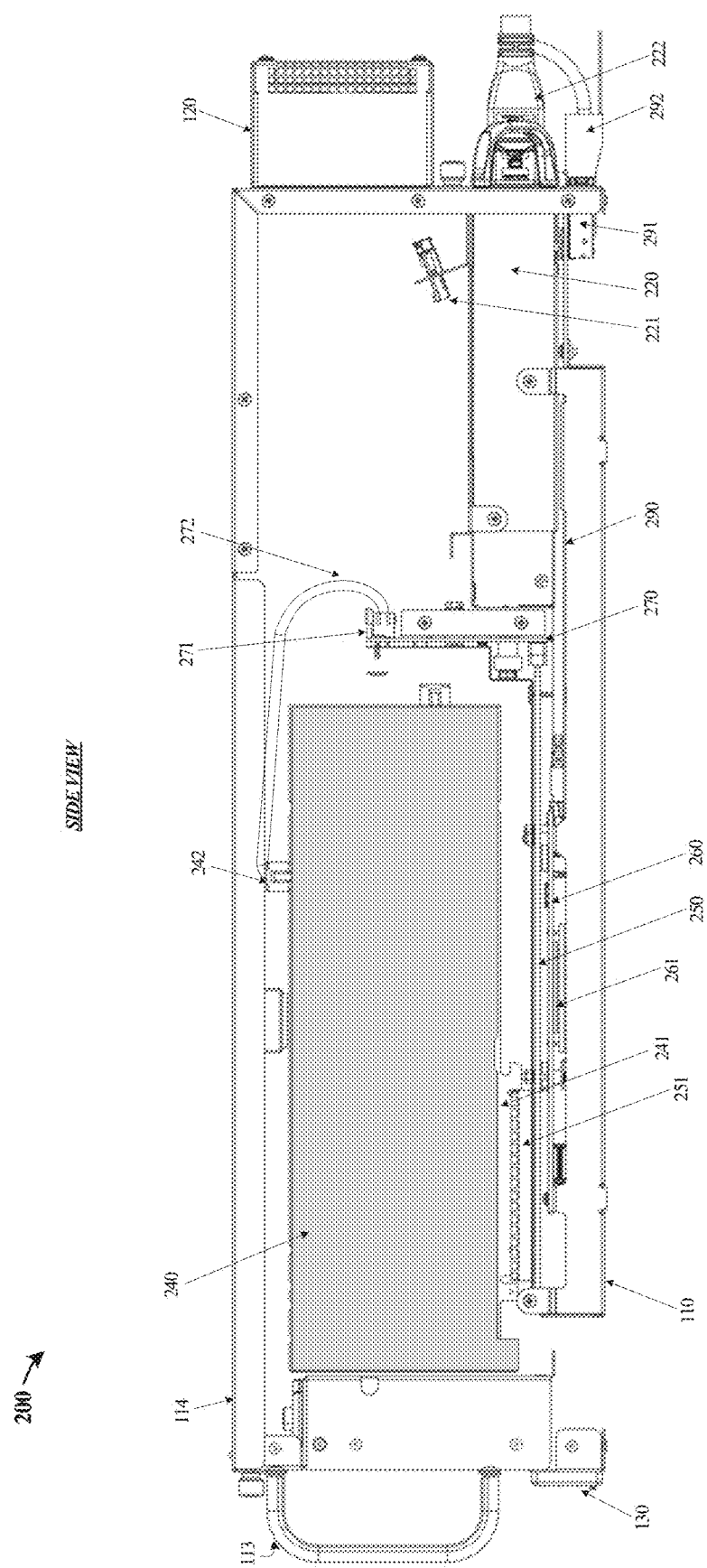
FIG. 2 is a diagram illustrating a side view of a high density peripheral card chassis in an implementation.
Figure 3:
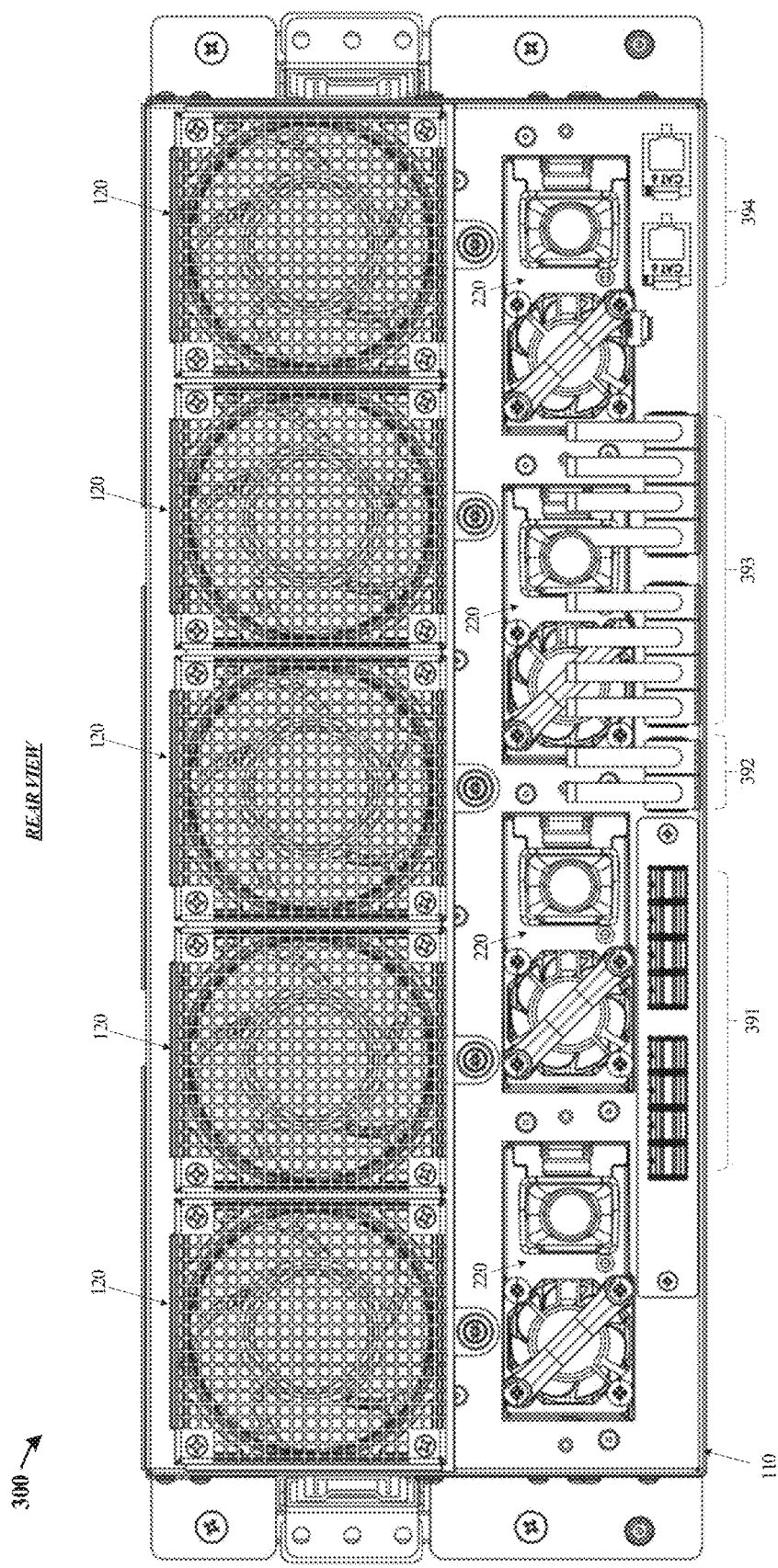
FIG. 3 is a diagram illustrating a rear view of a high density peripheral card chassis in an implementation.

System 100 may also include a back panel, partially visible in FIG. 1 and shown in greater detail in FIG. 3, having additional elements and components. The back panel may have one or more ports 111 for communicatively coupling the chassis 110 and its components to external systems. The back panel may further include one or more fan units 120. The fan units 120 may control the temperature within system 100 to prevent overheating, and may be always on, user controlled (e.g. via a software control interface or physical control), automatic (e.g. having temperature sensors to activate the fan(s) once the temperature of system 100 rises above a threshold), otherwise controlled, or any combination thereof. The fan units 120 may be individually removable and replaceable, and system 100 may allow for the fan units 120 to be replaced while the chassis 110 is in rack. FIG. 2 illustrates details of additional elements of example system 100.

FIG. 2 is a diagram illustrating a side view of an example high density peripheral card chassis computing system 200. System 200 may be an example of a same or different system from system 100 of FIG. 1. System 200 may include similar elements to those described in regard to FIG. 1, such as chassis or frame 110, removable lid 114, handle 113, status display 130, and fan units 120. FIG. 2 may provide a cross-sectional view of system 200, or a view of system 200 with a side panel removed, to display interior components within the chassis or enclosure 110.

System 200 may include one or more power supply units (PSUs) 220, such as four 2400-watt power supplies (277AC volt capable). The PSU 220 may receive power via a power cable 222, and distribute the power to components of system 200. For example, PSU 220 may provide power to fan(s) 120 via a fan connector 221, and power to other components of the system 200, such as card ports 251 and auxiliary power cables 272 by way of a power distribution board (PDB) 270.

Peripheral card(s) 240 may connect to card slots 251 using a connector element 241. For example, system 200 may include ten double-wide PCIe x16 (e.g. 16 lane) card slots 251, and GPUs 240 may connect to the slots 251 using x16 connector 241. Some peripheral cards 240, such as power-hungry GPU components, may utilize more power than is provided via the card port 251, such as a PCIe card slot. Those cards 240 may have an auxiliary power supply connector 242, allowing for the connection of an auxiliary power supply line 272.

The PDB 270 may also include one or more slot status indicator lights or LEDs 271. The status lights 271 may provide a visible indicator of which cards 240 or slots 251 are functioning properly or improperly, such as by blinking sequences, different colored lights, or other visible indicators. The indicator lights 271 may be visible through the opening slots 115 (shown in FIG. 1).

System 200 may comprise a set of stacked or layered boards having circuitry for providing power and data signals through and between components of system 200. In an example, card slots 251 may be connected to a mezzanine board 250, which may be situated over and connected to a main board 260, which may be connected to a super mezzanine board 290. A management processor or PCIe switch circuitry 261 may be provided within system 200 (e.g. connected to main board 260). In some examples, circuitry may manage functionality of system 200, such as fan control, error monitoring for status indicators 271 or status display 130, power distribution and control (e.g. providing power to or cutting power off from individual ports 251 or auxiliary cables 272 based on a connected status of a card 240 for the corresponding slot 251 and auxiliary connector 272), or other operations. Circuitry 261 may be configured to manage signal switching and routing of a PCIe fabric or similar signal switching configuration. The signal switching may enable various computing modules or cards 240 within system 200 to communicate directly with each other via switching modules or circuits, or to communicate with computing systems outside chassis 110 via external data ports.

System 200 may include one or more data or cable ports 291, such as Ethernet ports or mini-SAS (Serial Attached SCSI) HD (high density) ports. Data cables 292, such as ethernet cables or mini-SAS HD cables may be connected to the ports 291, and enable components of system 200 to communicate and exchange data with external computing systems. FIG. 3 provides another view of an example system, such as that depicted in FIGS. 1 and 2.

FIG. 3 is a diagram illustrating a rear view of an example high density peripheral card chassis computing system 300. System 300 may be an example of a same or different system from systems 100 and 200 of FIGS. 1 and 2. System 300 may include similar elements to those described in regard to FIGS. 1 and 2, such as chassis or frame 110, fan units 120, and power supply units 220. Power supply units 220 may each connect to a power supply cable (not shown), which can be connected to an external power source.

FIG. 2 provides another view of example data and control ports 291 of FIG. 2. For example, FIG. 2 depicts ports 391, 392, 393, and 394. Ports 391 and 393 may each represent two x16 mini-SAS HD ports (or optionally, eight x4 connections, or other configurations). In the depicted example, cables may be plugged into the 393 ports, but not into the 391 ports. The x16 ports may be used for large data transfers, such as for data processing, storage, or retrieval. Ports 392 may include two x4 mini-SAS HD ports (with connected cables). The ports 392 may by an example of management ports, such as may be used to communicate with a control circuit of system 300 to manage data switching or other operations of system 300. Ports 394 may include two Ethernet ports, which may likewise be used for data transfer or system management. More or fewer ports, or different types of ports, may also be included in system 300.

Figure 4:
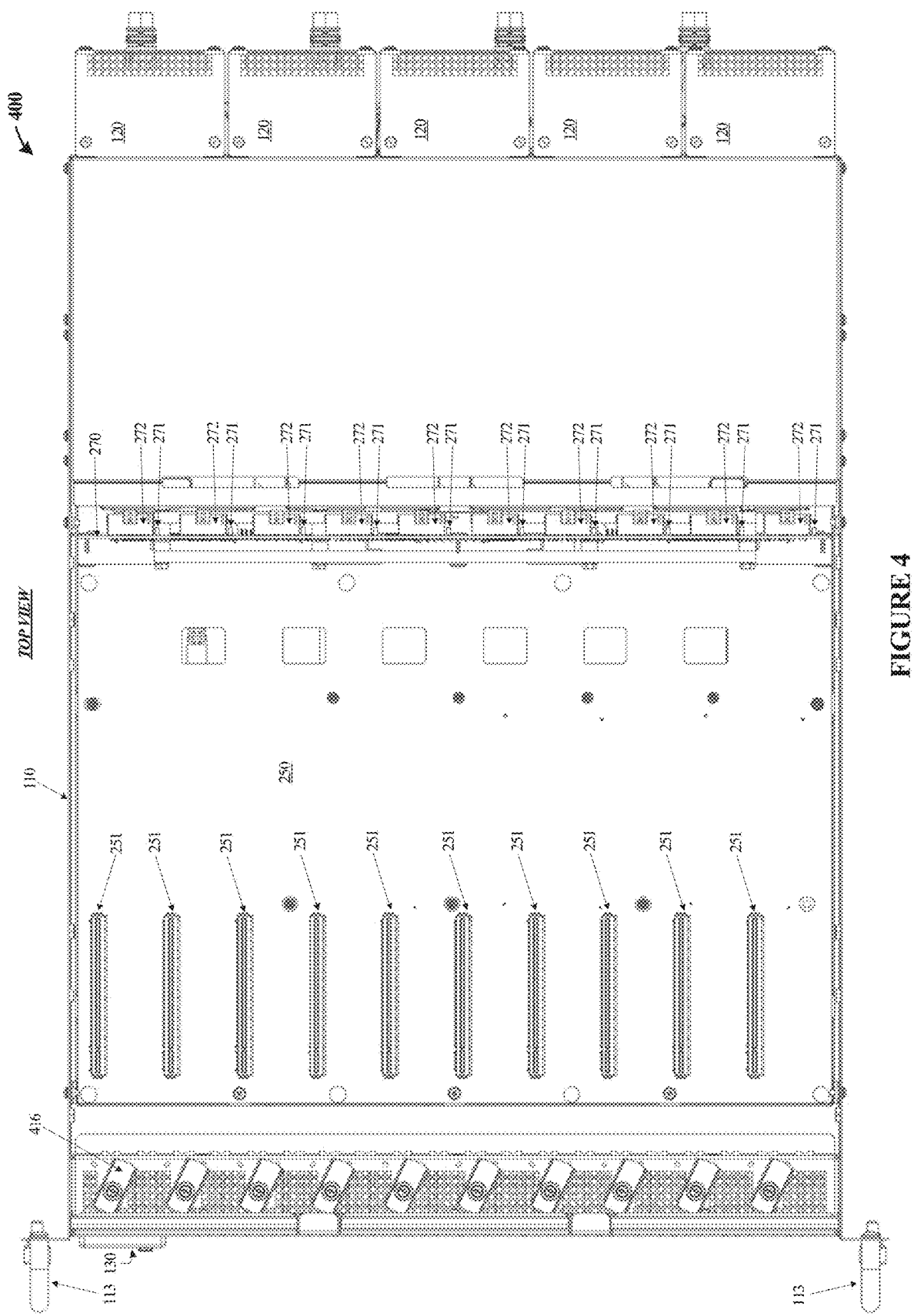
FIG. 4 is a diagram illustrating a top view of a high density peripheral card chassis in an implementation.

Turning now to FIG. 4, a diagram illustrating a top view of an example high density peripheral card chassis computing system 400 is depicted. System 400 may be an example of a same or different system from systems 100, 200, and 300 of FIGS. 1, 2, and 3. System 400 may include similar elements to those described in regard to FIGS. 1, 2, and 3, such as chassis or frame 110, hands 113, status display 130, fan units 120, mezzanine board 250, card slots 251, PDB 270, status display indicators or lights 271, and auxiliary power supply elements 272.

As shown in the top view, system 400 includes ten peripheral card slots or ports 251, such as PCIe slots, affixed to mezzanine board 250. PCIe cards can be connected to slots 251, and optionally may receive additionally auxiliary power via auxiliary power elements 272. System 400 may be configured to enable live hot swapping of cards into and out of system 400 while the system is powered on and other cards are active. System 400 may monitor to ensure a stable connection is detected at both slot 251 and auxiliary power 272, or else power to that slot and auxiliary cable may be shut off to prevent damage to a card.

Figure 5:
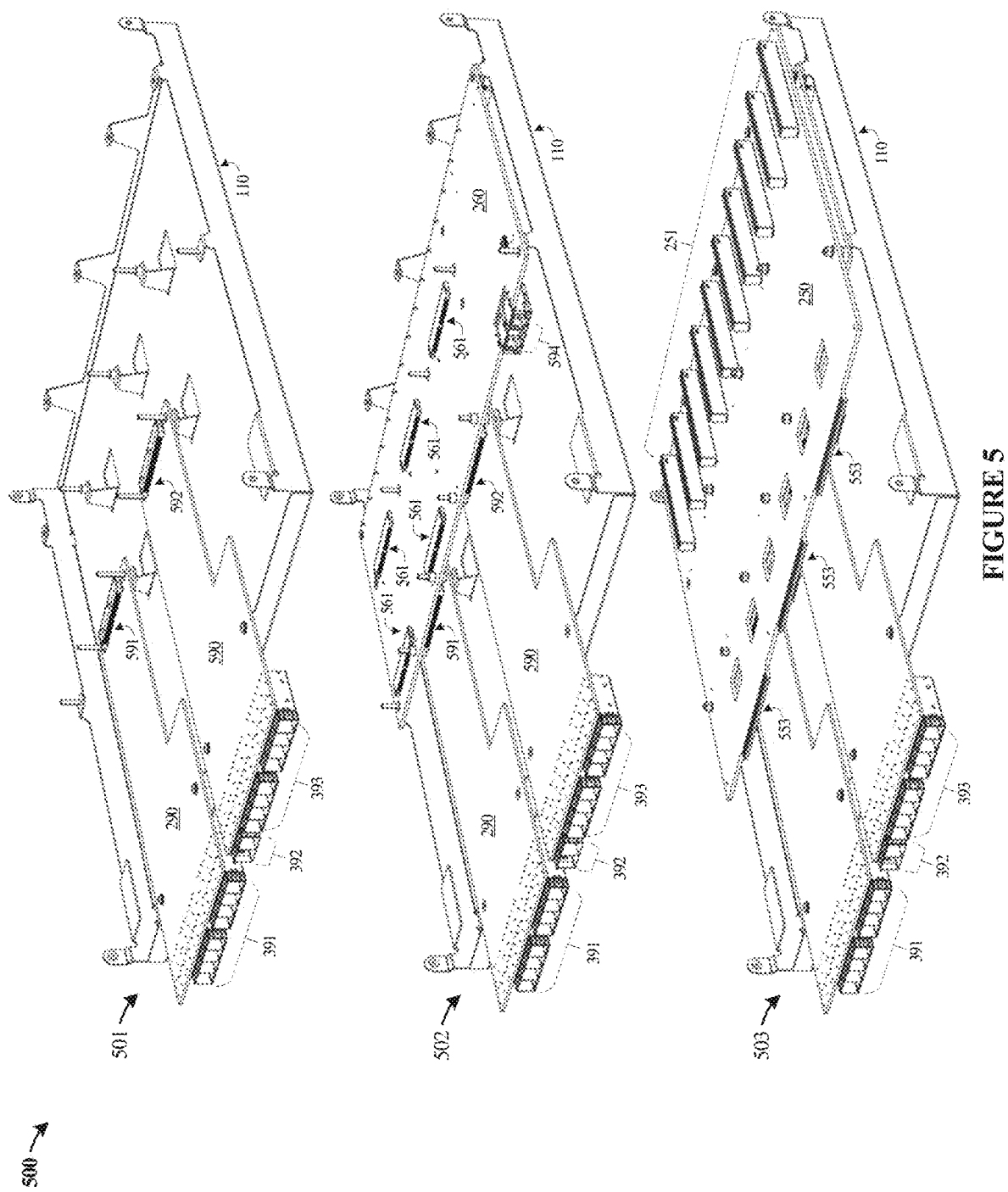
FIG. 5 is a diagram illustrating assembly elements of a high density peripheral card chassis in an implementation.

When a card is not functioning correctly, this status may be indicated via the associated status display LED 271, which may be visible through a front of the system 400. A malfunctioning card can attempt to be diagnosed or reset in-place, or may be removed without powering off system 400 as described herein. System 400 may include captive thumbscrews 416 to securely hold PCIe cards in their slots 251. The thumbscrews 416 may be loosened when a card is to be removed, or tightened once a card is inserted. FIG. 5 depicts an example high density peripheral card chassis, illustrating the layered circuit boards within the system.

FIG. 5 is a diagram illustrating assembly elements of a high density peripheral card chassis computing system 500 in an implementation. In particular, FIG. 5 depicts a set of stacked layers of circuit boards via diagrams 501, 502, and 503. System 500 may include an example of systems 100, 200, 300, and 400 of FIGS. 1, 2, 3, and 4, and may share similarly numbered elements.

Diagram 501 depicts a base panel comprising a bottom of chassis 110. A first circuit board layer may include super mezzanine boards 590 and 290. Super mezzanine board 290 may be connected to data ports 391, such as mini-SAS HD ports, and inter-board connector 591 configured to connect super mezzanine board 290 and main board 260. Super mezzanine board 290 may provide a connection between ports 391 and main board 260, to transfer data communications to and from computing systems external to system 500 with computing components within system 500. Similarly, super mezzanine board 590 may be connected to and act as a conduit between data ports 392 and 393, and main board 260 via inter-board connector 592.

Diagram 502 depicts an additional circuit board, including motherboard or main board 260. Main board 260 may control or facilitate various operations of system 500, including power allocation and communication between components of system 500 and between system 500 and external systems. In some examples, the inter-board connectors 591 and 592 may communicatively connect super mezzanine boards 290 and 590 with main board 260, and therefore connect main board to external ports 391, 392, and 393. Main board 260 may also include data port 594, which may include ethernet or similar ports that may connect via cable to external ethernet ports 394 on the chassis 110. Main board 260 may include one or more inter-board connector circuits 561, which may connect main board 260 with mezzanine board 250.

Figure 6:
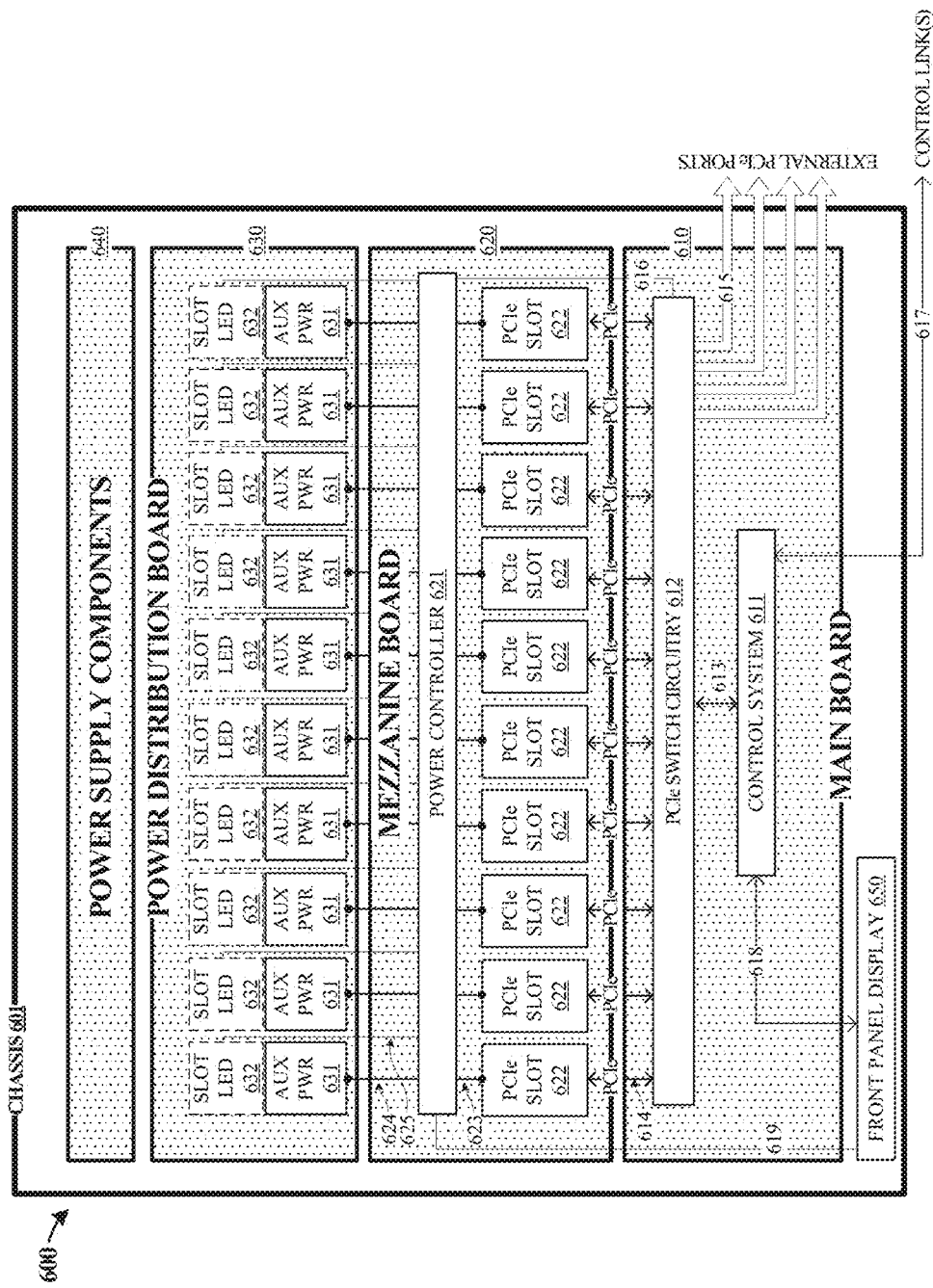
FIG. 6 is a diagram illustrating a computing system in an implementation.

Diagram 503 depicts a third layer of circuit boards, including mezzanine board 250. The mezzanine board 250 may be a daughterboard that may connect to main board 260, for example via switch or connecting circuitry 561. A plurality of peripheral card slots or ports 251, such as PCIe slots, may be included on mezzanine board 250. Mezzanine board 250 may also include edge connector circuits 553, which may connect to other components of system 500, such as power distribution board (PDB) 270. FIG. 6 depicts another example diagram for a high density peripheral card chassis computing system.

FIG. 6 is a system diagram illustrating an example high density peripheral card chassis computing system 600. System 600 may correspond to systems 100, 200, 300, 400, and 500 of FIGS. 1, 2, 3, 4, and 5. System 600 may include chassis 601 having physical computing components coupled over a communication fabric. Computing system 600 may include several circuit boards which have various components, namely mezzanine board 620, main board 610, and power distribution board 630. In addition, various support circuitry, structural support elements, enclosure elements, and power supply components 640 are included in chassis 601. For example, a front panel display 650 may be included within or on chassis 601. It should be understood that a different configuration or arrangement of circuit boards and chassis component can be employed. Chassis 601 might be a rackmount structure which includes the various components shown in FIG. 6, having an enclosure and various ports for connecting to other equipment external to the enclosure.

The communication fabric of FIG. 6 is formed from among a plurality of PCIe switching elements, indicated by PCIe switch circuitry 612 on main board 610. FIG. 6 also includes a set of PCIe peripheral card slots 622, and a set of PCIe expansion ports 615 which can provide connection to external hosts. Thus, an external host, such as a CPU not included in computing system 600 coupled over external PCIe ports 615, can access resources of computing system 600, such as certain PCIe slots 622. These external hosts might couple into computing system 600 using native PCIe, NVMe protocols over PCIe, or connect over InfiniBand (IB) provided by an expansion card in one of the PCIe slots 622.

Returning to a discussion on the various boards included in FIG. 6, mezzanine board 620 may comprise one or more circuit boards populated with electrical components, interconnect, and a plurality of PCIe slots 622. Different sets of the PCIe slots 622 may be provided from different ones of a set of PCIe switches. In this example, ten (10) PCIe slots are provide in total, each having a x16 data width. Mezzanine board 620 may also comprise power controller 621 which provides for power filtering, conversion, distribution, switching, and control for each of the 10 PCIe slots. Power may be provided or distributed to some components via a power distribution board (PDB) 630, which may include auxiliary power connectors 631 and slot-specific LEDs 632. Power managed by the power controller 621 may include power provided over the PCIe slot connections 623 (e.g. 3.3V and 12V), as well as power provided over lines 624 to auxiliary power connectors 631 (e.g. 12V) configured to connect to peripheral cards which require additional power. Power controller 621 may provide for individually powering on/off of PCIe slots 622 and auxiliary power connections 631 so that individual peripheral cards can be removed or swapped while others remain powered and functional. In this manner, a powered-on and 'booted' system can have one or more PCIe cards swapped out to provide robust failure recovery for failed cards or to perform in-situ expansion of components/capacities. Indicator lights 632 (e.g. LED lights) may be powered via lines 625 for each PCIe slot 622, and may provide visual indicators of status, failure, operational mode, power status, or other information to an operator. Power controller 621 may also manage power to front panel display 650 via line 619.

Main board 610 comprises one or more circuit boards populated with electrical components. These components may form a PCIe fabric and various interconnect with other circuit boards of chassis 601. The PCIe fabric comprises a plurality of PCIe switches indicated by PCIe switch circuitry 612 as well as various control elements. Among these control elements may be control system 611 which controls PCIe switch circuitry 612, provides control access to external agents (e.g. via control link(s) 617) to control system 611 and PCIe switch circuitry 612, and also provides various fabric management functions to compose/decompose logical arrangements of computing components within the PCIe fabric. Control system 611 may also include a fabric control interface comprising a communication link between control system 611 and any component coupled to the associated communication fabric(s), which may comprise one or more PCIe links. In some examples, the fabric interface may employ Ethernet traffic transported over a PCIe link or other link. The fabric control interfaces can be arranged into one or more control planes each having different communication architectures and protocols to allow operations and users to interface with controller elements and control the PCIe fabric. Moreover, control system 611 may obtain and indicate telemetry data to external entities. Control system 611 may also control power functions of mezzanine board 620 over link 616, either via PCIe switch circuitry 612 or via a direct link. In addition, control system 611 may control operation of front display panel or status panel 650, including controlling what indicators to display and receiving any input from interface components of front display panel 650.

Control system 611 can comprise one or more microprocessors and other processing circuitry that retrieves and executes software, such as job interfaces and fabric management software, from an associated storage system (not shown). Control system 611 can be implemented within a single processing device but can also be distributed across multiple processing devices or sub-systems that cooperate in executing program instructions. Examples of control system 611 may include general purpose central processing units, application specific processors, and logic devices, as well as any other type of processing device, combinations, or variations thereof. In some examples, control system 611 comprises an Intel® microprocessor, Apple® microprocessor, AMD® microprocessor, ARM® microprocessor, field-programmable gate array (FPGA), application specific integrated circuit (ASIC), application specific processor, or other microprocessor or processing elements.

Status display or front display panel 650 may include an OLED or similar display which can provide indicators for the status of components of system 600. The status display 650 may indicate a power status or settings for system 600, a status for one or more cards or slots 622, or other indicators based on control signals from control system 611. The status display 650 may provide color coded errors or status indicators (e.g. via solid colors or blinking light), or the display 650 may provide text-based error indicators, such as displaying error codes. The front panel display 650 may also include one or more user input components, such as buttons, touchscreen, switches, dials, or similar inputs. User inputs may be provided to control system 611 via line 618. Front panel display 650 may receive power or control signals from power controller 621 via line 619.

Power supply components 640 comprises various power conversion, power handling, filtering, and regulation circuitry. Power supply components 640 typically converts an input or source voltage to a working voltage level for components in chassis 601, as well as provides for surge protection, short circuit protection, polarity protection, and other forms of protection and interference mitigation. Moreover, power supply components 640 can include thermal handling components to remove heat from chassis 601, such as fans, cooling units, chillers, air conditioning elements, or other similar components. Redundancy may be included in power supply components 640 to provide for continuous operation and power supply stability over various failures in equipment within power supply components 640.

In addition to the components for each circuit board discussed above in chassis 601, further components can be included, such as control circuitry, telemetry agents and components, glue logic, interconnect, on-board and inter-board connectors, sockets, power supply and conversion equipment/circuitry, mechanical structural elements and supporting members, heating/cooling components, fans, sub-enclosures, as well as other equipment and circuitry.

CPU elements, network interface cards (NICs), GPUs, FPGAs, storage drives, further co-processing elements, or any PCIe-compatible devices can be populated into peripheral add-in cards in PCIe slots 622. Using these physical computing components (CPU, GPU, NIC, storage, or other devices), computing arrangements can be formed, referred to herein as compute units, which are segregated within the PCIe fabric from one another. These can form individual computers or servers which can be reconfigured on-the-fly to have a different arrangement of physical components or different quantity of physical components. Pools of physical computing components can be formed from the physical computing component populated into PCIe slots 622, as well as in other chassis or systems coupled over one or more of external PCIe links 615.

A PCIe fabric may be formed from a plurality of PCIe switches included in PCIe switch circuitry 612, which may be referred to as PCIe cross-point switches. PCIe switch circuitry can be configured to logically interconnect various PCIe links based at least on the traffic carried by each PCIe link. In these examples, a domain-based PCIe signaling distribution can be included which allows segregation of PCIe ports of a PCIe switch according to operator-defined groups. The operator-defined groups can be managed by control system 611 which logically assembles physical computing components into associated compute units and logically isolates physical computing components among different compute units. Control system 611 can control PCIe switch circuitry over a fabric interface (e.g. link(s) 613) coupled to the PCIe fabric, and alter the logical partitioning or segregation among PCIe ports and thus alter composition of groupings of the physical components. In addition to, or alternatively from the domain-based segregation, each PCIe switch port can be a non-transparent (NT) port or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. Advantageously, this domain-based segregation (NT port-based segregation) can allow physical components (e.g. CPUs, CoPUs, storage units, FPGAs, NICs) to be coupled to a shared fabric or common fabric but only to have present visibility to those components that are included via the segregation/partitioning into a compute unit. Thus, groupings among a plurality of physical components can be achieved using logical partitioning among the PCIe fabric.

This partitioning is scalable in nature, and can be dynamically altered as-needed by control system 611 or other control elements.

The systems and operations discussed herein provide for dynamic assignment of physical computing components, such as CPUs, GPUs, NICs, FPGAs, or storage resources to a computing cluster comprising compute units. The compute units may be disaggregated and reside in a pool of unused, unallocated, or free components until allocated (composed) into compute units. A management entity, such as control system 611, can control composition and de-composition of the compute units and provide interfaces to external users, job management software, or orchestration software. Physical computing components can be swapped in and out of compute units and associated clusters on-the-fly, and these resources can be assigned to other compute units or clusters. In one example, when resources experience failures, hangs, overloaded conditions, then additional resources can be introduced into the compute units and clusters to supplement the resources.

Various triggers can be employed to modify or alter compute units after formation. In a first trigger, an event-based trigger is employed. These event-based triggers can alter or modify a compute unit or add additional compute units to support jobs or work units that comprise jobs. Based on observations by control system 611 of dynamic events or patterns exhibited by jobs, control system 611 can initiate changes to the configurations of compute units and resources assigned thereto. Examples of such events or patterns include observed resource shortages for a process, a specific string being identified by a function, a specific signal identified by an intelligent infrastructure algorithm, or other factors which can be monitored by control system 611. Telemetry of the executing jobs or analysis of the properties of the jobs prior to or during execution can inform control system 611 to initiate dynamic changes to the compute units. Thus, control system 611 can alter composition of compute units to add or remove resources (e.g. physical computing components) for the compute units according to the events or patterns. Advantageously, the compute units can be better optimized to support present resource needs of each job, while providing for resources to be intelligently returned to a pool when unneeded by present jobs or for use by other upcoming jobs.

Another alternative trigger includes temporal triggers based on machine learning type of algorithms or user-defined timeframes. In this example, patterns or behaviors of composed compute units can be determined or learned over time such that particular types of jobs exhibit particular types of behaviors. Based on these behaviors, changes to compute units can be made dynamically to support workload patterns. For example, control system 611 might determine that at certain phases of execution of particular types of jobs that more/less storage resources are needed, or more/less co-processing resources are needed. Control system 611 can predictively or preemptively alter the composition of a compute unit, which may include addition or removal or resources, to better optimize the current resources assigned to a compute unit with the work units being executed by a job. Temporal properties can be determined by control system 611 based on explicit user input or based on machine learning processes to determine timeframes to add or remove resources from compute units. Control system 611 can include resource scheduler elements which can determine what resource changes are needed and when these changes are desired to support current and future job needs. The changes to the compute units discussed herein may require re-composition and re-starting of the compute units and associated operating systems in some examples, such as when adding or removing certain physical components or resources. However, other changes, such as adding/removing storage or network interface resources might be accomplished on-the-fly without re-staring or re-composition of a particular compute unit.

Figure 7:
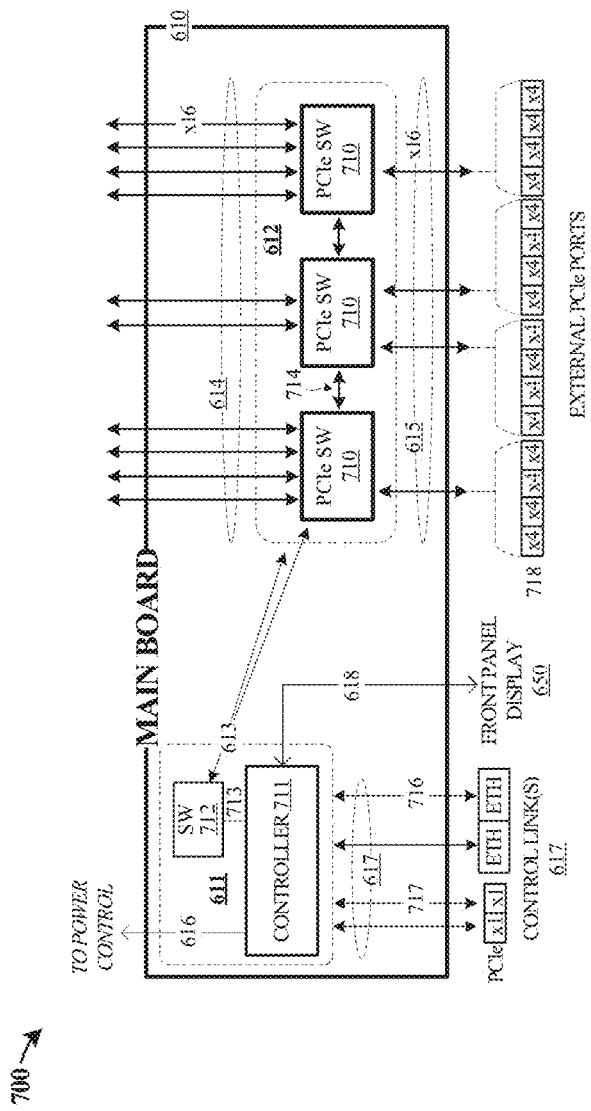
FIG. 7 is a diagram illustrating a main circuit assembly in an implementation.

Turning now to a discussion on elements of main board 610, FIG. 7 is presented. FIG. 7 illustrates main board 610 in configuration 700. Although main board 610 of FIG. 6 is referenced for illustrative purposes, it should be understood that other configurations and arrangements of the associated circuitry can be employed. Main board 610 includes PCIe switch circuitry 612, control system 611, and several external ports/links. The elements of main board 610 comprise a PCIe-based communication fabric, with PCIe switches 710 being controlled by control system 611 over link(s) 613 to provide various logical segregations or partitions among PCIe links/ports. In some examples, PCIe switches 710 comprise PLX/Broadcom/Avago PEX series chips, such as PEX8796 24-port, 96 lane PCIe switch chips, PEX8725 10-port, 24 lane PCIe switch chips, PEX97xx chips, PEX9797 chips, or other PEX87xx/PEX97xx chips.

PCIe switches 710 may link to devices coupled over PCIe links or ports 614 and 615. PCIe links 614 may be coupled to PCIe expansion slots 622 on mezzanine board 620, and PCIe links 615 may be coupled to a plurality of external PCIe ports 718 for coupling to other PCIe devices, hosts, or management entities external to chassis 601. PCIe switches 710 may be coupled to other PCIe switches 710 via links or ports 714. Logical arrangements can be formed among any selected PCIe links 614, 615, 714 and corresponding devices, which typically includes one PCIe root complex associated with a host device (e.g. CPU). This PCIe host device can be included in PCIe expansion slots on mezzanine board 620 or coupled over any of external PCIe ports 718. It should be noted that example width or quantity of PCIe traffic lanes is indicated in FIG. 7 (and other Figures herein) by x16 for sixteen-lane PCIe links, x4 for four-lane PCIe links, and x1 for one-lane PCIe links. Other widths and configurations are possible.

Peer-to-peer arrangements can be formed among any of the PCIe slots to provide for data transfer among corresponding peripheral cards inserted into the PCIe slots without transferring the data through a PCIe root complex or host device. For example, PCIe slots within chassis 601 can communicate with each other via links 614, switches 710, and links 714. Alternately, PCIe slots within chassis 601 may communicate with slots external to chassis 601 via links 614, switches 710, and links 615. Peer-to-peer communications may be managed by control system 611, or may be available to peripheral cards plugged into the PCIe slots without control by control system 611.

Figure 9:
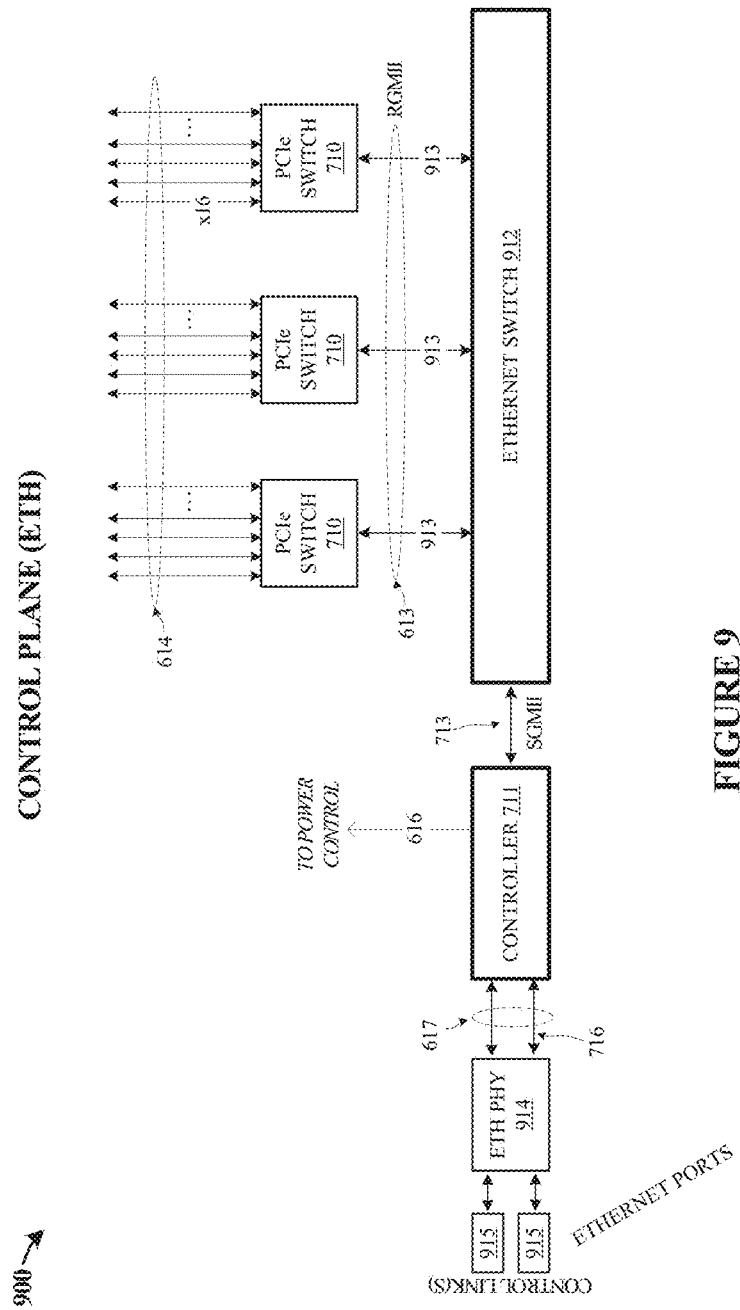
FIG. 9 is a diagram illustrating a control plane for a communication fabric in an implementation.
Figure 10:
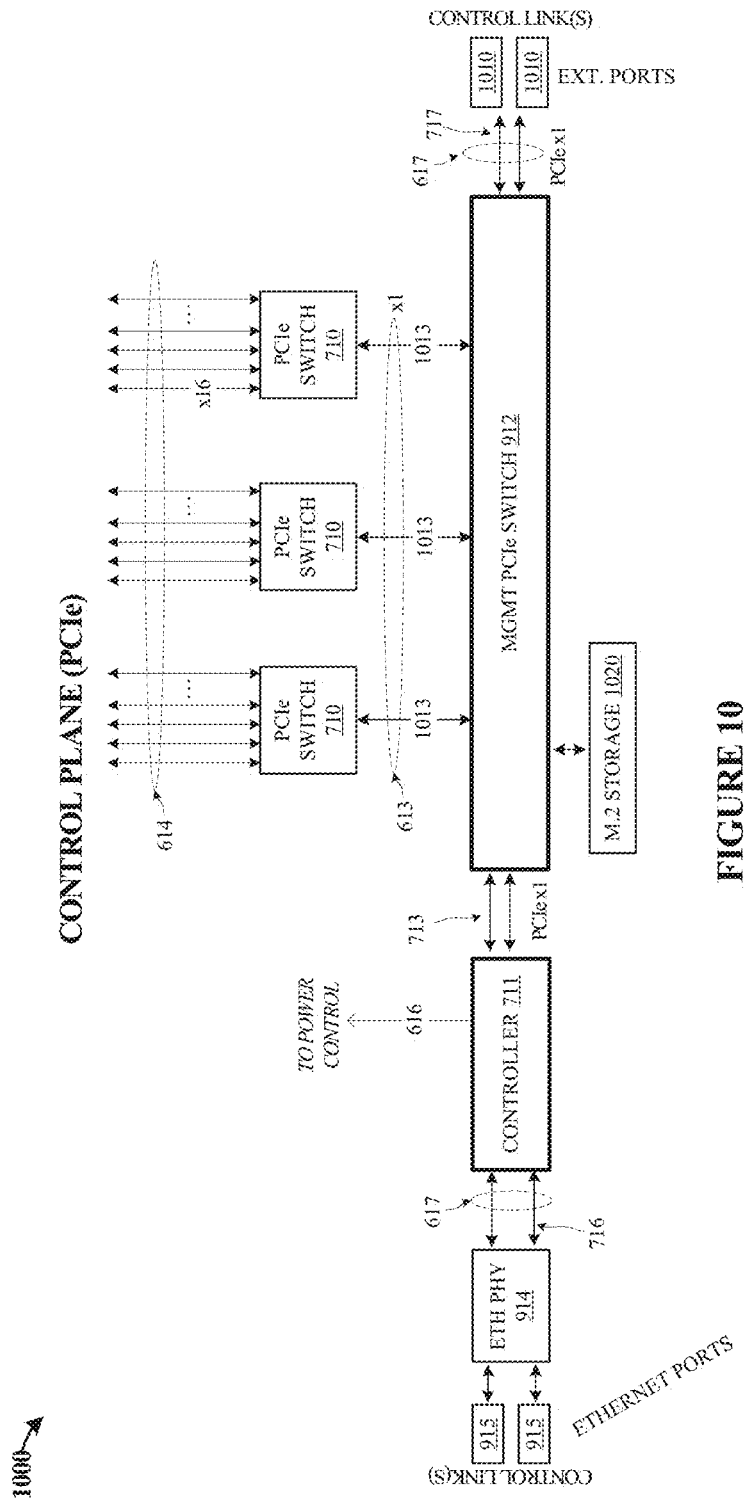
FIG. 10 is a diagram illustrating a control plane for a communication fabric in an implementation.
Figure 11:
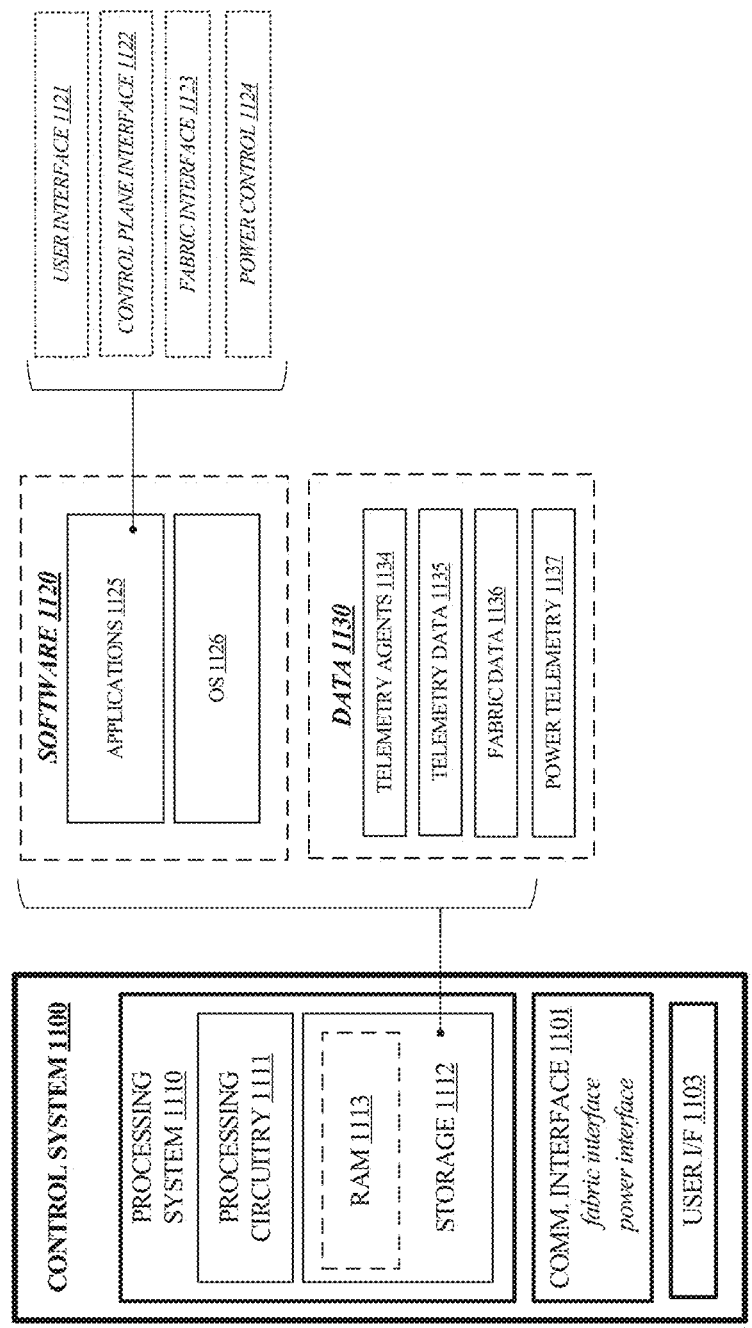
FIG. 11 is a diagram illustrating a control system in an implementation.

To control operations of PCIe switches 710, such as to form and dissolve the logical arrangements among links/devices, control system 611 is provided and discussed herein. FIG. 7 illustrates example components of control system 611, although further configurations are shown in FIGS. 9-11. Control system 611 includes controller 711 and communication switch 712 coupled over one or more links 713. Link 713 can comprise Ethernet links, or variations/derivatives thereof, or may instead comprise PCIe links, such as single lane (x1) PCIe links. Communication switch 712 provides fan-out or switched multiplexing for one or more fabric control links 613 which couple to PCIe switch circuitry 612, to each of PCIe switches 710, or a combination thereof. Control system 611 can control PCIe switches 710 over fabric control links 613 and alter the logical partitioning or segregation among PCIe ports and thus alter composition of compute unit groupings of corresponding physical computing components. Fabric control links 613 can comprise either Ethernet-style links (e.g. Serial Gigabit Media Independent Interface (SGMII) or reduced gigabit media-independent interface (RGMII)) or PCIe links, as detailed in FIG. 9-10, but fabric control links 613 are not limited to such link types.

Control system 611 provides link 616 to control power functions of mezzanine board 620, although mezzanine board 620 can include further control systems, logic, and controllers which communicate with controller 711 over link 616. Control system 611 may also provide link 618 to control and receive inputs from front panel display 650. Links 616 and 613 can comprise various communication links, such as inter-integrated circuit (I2C) interfaces, System Management Bus (SMBus) interfaces, Power Management Bus (PMBus) interfaces, network interfaces, or other serial or parallel point-to-point or multi-point interfaces discussed herein. Controller 711 also provides for one or more fabric control or management interfaces 617. Control interfaces 617 can include Ethernet-style of interfaces (e.g. SGMII or RGMII) or PCIe compatible interfaces. FIG. 7 shows examples of control interfaces or 617, namely PCIe links 717 coupled to external PCIe ports and Ethernet links 716 coupled to external Ethernet PHY/ports. The exact arrangement and configuration of links 713, 716, 717 can vary based on the type of control plane employed for the PCIe fabric, as shown in FIGS. 9-10.

Controller 711 can comprise one or more microprocessors and other processing circuitry that retrieves and executes software, such as management operating systems, user interfaces, and job interfaces, from an associated storage system. Controller 711 can be implemented within a single processing device but can also be distributed across multiple processing devices or sub-systems that cooperate in executing program instructions. Examples of controller 711 include general purpose central processing units, application specific processors, and logic devices, as well as any other type of processing device, combinations, or variations thereof. In some examples, controller 711 comprises an Intel® or AMD® microprocessor, Apple® microprocessor, ARM® microprocessor, field-programmable gate array (FPGA), application specific integrated circuit (ASIC), application specific processor, or other microprocessor or processing elements.

Figure 8:
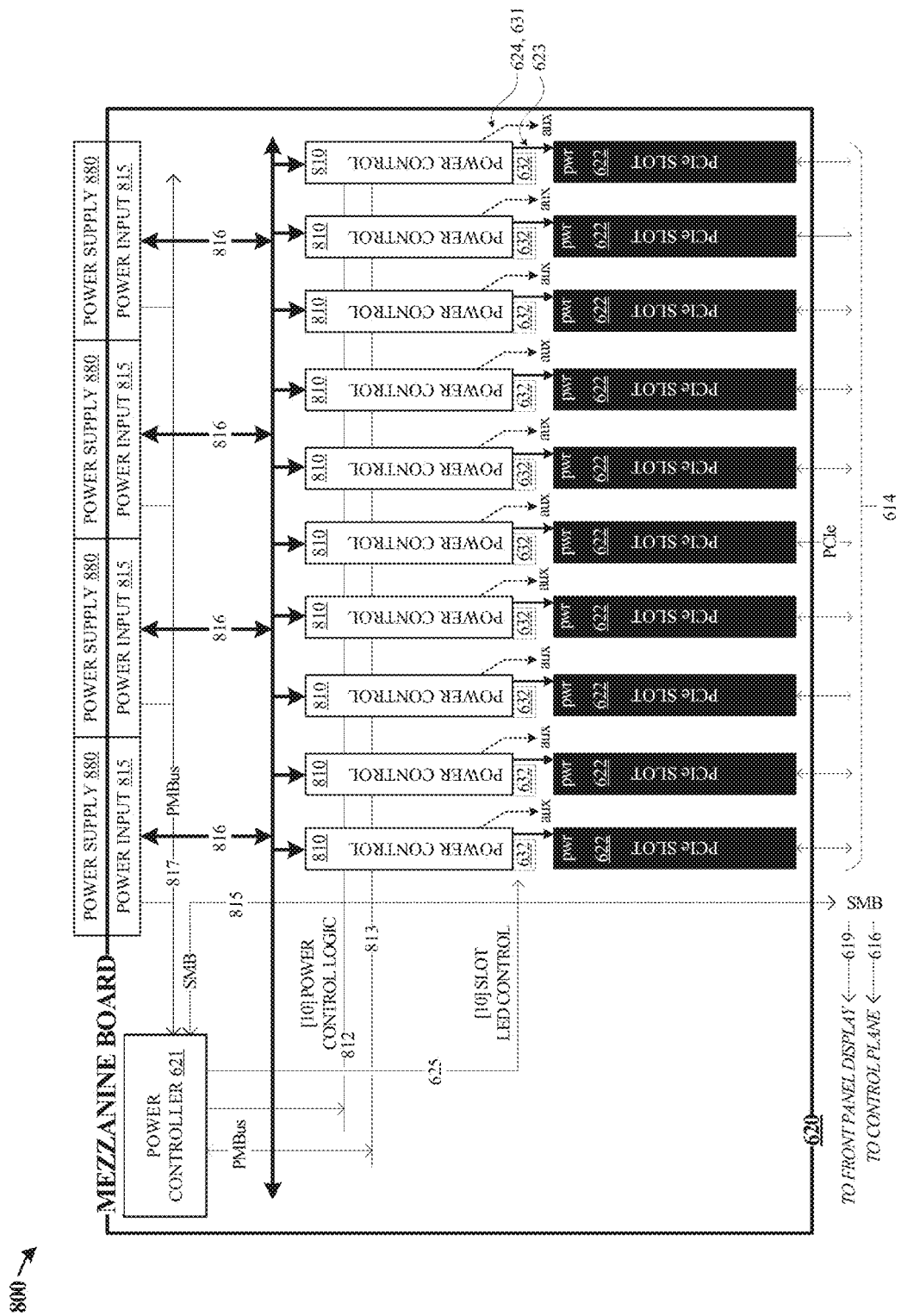
FIG. 8 is a diagram illustrating a mezzanine circuit assembly in an implementation.

Turning now to a discussion on elements of mezzanine board 620, FIG. 8 is presented. FIG. 8 illustrates mezzanine board 620 in configuration 800. Although mezzanine board 620 from FIG. 6 is referenced in FIG. 8 for illustrative purposes, it should be understood that other configurations and arrangements of the associated circuitry can be employed. Mezzanine board 620 includes power controller 621 which is coupled to several instances of power control circuitry 810 over links 812, 813, and 625. In this example, link 812 comprises several instances of discrete links for controlling logic circuitry within each of power control circuitry 810. Link 813 comprises PMBus or other serial interfaces which communicate with logic circuitry within each of power control circuitry 810. Power controller 621 is also communicatively coupled to several instances of power input circuitry 815 over PMBus 817. Power controller 621 is coupled to slot indicator light control for indicator lights 632 over links 625, which might comprise discrete signal lines or shared serial communication bus lines. Power controller 621 is also optionally coupled to a control plane provided by control system 611 of main board 610 via link 815 and 616, and coupled to front display panel 650 via links 815 and 619. In some examples, one or more functions of power controller 621 can be included instead within control system 611.

Power input circuitry 815 receives input power via power supply lines or elements 880, and performs one or more power conversion or voltage regulation activities, such as step-up or step-down conversions to produce voltages/currents required by PCIe slots 622. Example voltages include 3.3VDC and 12VDC, among others. Power input circuitry 815 can be monitored over link 817, as well as enabled/disabled and configured over link 817 by power controller 621. Power input circuitry 815 provides one or more output voltages over links 816 to power control circuitry 810 which controls distribution and enabling/disabling of power to individual PCIe slots 622. Independent power control can be achieved for each of PCIe slots 622 to allow for in situ 'live' removal and insertion of selected PCIe expansion cards independent of the powered state of other PCIe expansion cards. Status indicators shown as indicator lights 632 for each slot 622 will display a current state of power as well as other information based on indicator color, on/off status, and selected blinking state/patterns. Power can be disabled for slots 622 that are not presently in use, even if populated with an expansion card. Power control for individual slots 622 can be controlled by control system 611 over links 616 and 815 or power controller 621 over links 812-813, including combinations thereof. In operation, a plurality of power links will be energized for individual ones of PCIe slots 622 according to such control.

Power control circuitry 810 provides power to corresponding PCIe slots 622, with this power individually controlled for each PCIe slot. Moreover, power can be applied or removed for each slot while others among the slots are active or powered. To provide this functionality, power control circuitry 810 includes circuitry and logic to apply all power inputs to an individual slot concurrently, such that 3.3VDC and 12VDC sources are applied concurrently. This can prevent or reduce the likelihood of shorting and power sneaks across power domains of the actual peripheral card inserted into a slot. For example, when one voltage is applied while another remains un-applied, then current might find a path through circuitry or across unrelated power domains on the peripheral card which causes damage to the peripheral card. This concurrent power is applied to 12VDC which is provided through a slot connector for the corresponding PCIe slot/socket as well as for an auxiliary power connector, if employed. The auxiliary power connector is often employed on peripheral cards that consume large quantities of power and supplements to the 12VDC supplied through the slot connector itself. Often, GPU peripheral cards consume larger quantities of power than other peripheral cards, and thus require use of an auxiliary power connection. Power control circuitry 810 includes logic/circuitry to concurrently apply 12VDC power to the auxiliary connection (e.g. links 624 from aux power source 631) and PCIe slot power (e.g. links 623), along with any applicable accessory power or 3.3VDC power for that slot. Power controller 621 can initiate power on/off events over logic links 812 or via PMBus 813, which may take into account information or control signals provided over links 616 and 815.

Current sensing and control is also provided by power control circuitry 810. This current sensing, referred to as an electronic fuse or e-fuse, provides limits on the current draw for each slot. This current limit can reduce damage to peripheral cards by preventing too much current being drawn during failure modes or short circuit conditions. Moreover, the e-fuse functionality is resettable, so that power can be re-applied after an e-fuse reset process has been performed by power control circuitry 810. The current sensed can be digitized and provided to power controller 621 over PMBus 813 or other means.

Slot status indicators are included as slot LEDs 632, and controlled by power controller 621 over link(s) 625. Based on control signals from power controller 621, LEDs 632 can indicate present operational status, power status, failure or error status, or other indicators for the associated slot or peripheral card using various combinations of blinking, blinking rates/delays, colors, and other features. Moreover, LEDs 632 can be employed by an operator to obtain knowledge of the slot when servicing a peripheral card. For example, the LED for a slot can indicate when the power of the slot has been removed and a peripheral card can be removed. Each LED 632 can indicate which slots 622 are currently experiencing power issues or failures, so that an operator can quickly determine which peripheral card should be debugged, reset, removed, or replaced.

Example per-slot status LED 632 light signals may include:

| Slot status | LED behavior |
| --- | --- |
| Ready to receive card | LEDs flash in rapid succession (200 ms ON-OFF) |
| New card plug detected | LED turns off for 5 s, then LED starts flashing in rapid succession (200 ms ON-OFF) for the link selected for 5 s. Power to the slot is turned on Switch is working on establishing a link to this port Once established; Turn LED's off for 1 second, then enter status mode presenting link state |
| Slot is powered on with no fault | Solid light |
| Electrical current fault | Light ON 250 ms-OFF 250 ms, ON 500 ms-OFF 500 ms, ON 1 s-OFF 2 s, and repeat. Power is latched off |

In an example, the system may detect a PCIe generation of a card inserted into a slot, and the system may indicate that information via the associated LED. For example, a Gen 4 card may maintain a solid light when the slot is powered on with no faults, while different blink patterns may be used to indicate cards of Gen 3 (e.g. on 1 s, off 250 ms), Gen 2 (e.g. on 1 s, off 500 ms), or Gen 1 (e.g. on 1 s, off 1 s). Rather than or in addition to fixed blinking patterns to indicate various statuses, the LEDs 632 may also provide information in alternate styles. For example, a morse code-style binary flashing pattern may be employed, with a "1" indicated by a 500 ms light duration, and a 0 indicated by a 200 ms light duration, with a spacing interval of 1 second.

The LEDs 632 may also be used in association with a guidance mode for setting up a new card in a slot, for guidance when removing a card, or other processes. For an example setup process, software or firmware for the system may request or obtain an indication of which slots 622 to configure, and a width of the card to be inserted (e.g. a quantity of lanes to use, such as x1, x4, x8, or x16). This information can be obtained through a user interface of a remote host or other device, or via an interface of the chassis, such as front panel display 130 or 650. The selected slots 622 may have their associated LEDs 632 blink for an adjustable period, such as 10 seconds. An LED 632 for a first port 622 to be connected may remain blinking (e.g. 200 ms on-off), while the other LEDs 632 for the remaining ports may be switched off. When a solid connection with an inserted card is detected at the first slot, the associated LED 62 may go solid, and an LED for the next slot 622 to be connected may start blinking, and so on for all remaining slots 622 to be connected. The LEDs 632 may flash in rapid succession (e.g. 200 ms on-off) while a communication link is established with the inserted cards, and then the LEDs 632 may switch off for, e.g. 1 second, and then enter a status mode presenting the current link state.

Other features of power control circuitry 810, in combination with power controller 621, include individual slot power control and power status telemetry, auto-power off of individual slots during servicing of peripheral cards within the slots, various reset features, and wake support. The reset features include the ability to hard-cycle power for each slot 622 individually to effect a restart of the associated peripheral card. This hard-cycle included removal of all power to a slot 622, waiting a predetermined delay, and applying power to the slot. This operation can be performed while other slots remain functional and powered—allowing for individual debug and reset of each slot 622 during operation of the associated computing system.

Physically, each PCIe slot 622 comprises a x16 PCIe slot connector. Slot widths can be selected to support single-wide or double-wide PCIe cards, among other widths, including combinations thereof. Auxiliary power connectors/cables are employed for links 624 to supply additional power to each slot/card, as mentioned above. Also, when compatible GPU cards are employed, NVlinks can be used for point-to-point connections among each GPU card separately from the PCIe interfaces.

In operation, physical computing components, such as CPUs, GPUs, NICs, FPGAs, or storage resources can be included on peripheral cards and inserted into any of PCIe slots 622. Power control can be achieved for each slot individually to power on or power off one or more of the peripheral cards, allow for hot-swapping of individual cards, and allow for in-situ replacement or servicing of cards. Once populated with a selected set of peripheral cards, PCIe slots 622 interface over PCIe interfaces 614 to a PCIe fabric and provide physical computing components to a computing cluster. Compute units can be arbitrarily formed among any of the included peripheral cards, and this configuration among cards can be changed to suit present needs of the computing system. Each peripheral card is disaggregated and may reside in a pool of unused, unallocated, or free components until allocated (composed) into compute units. A management entity, such as control system 611, can control composition and de-composition of the compute units and provide interfaces to external users, job management software, or orchestration software. Physical computing components can be swapped in and out of compute units and associated clusters on-the-fly, and these resources can be assigned to other compute units or clusters.

FIG. 9 is a diagram illustrating control plane 900 for a communication fabric in an implementation. Control plane 900 provides for sideband or out-of-band control over the operation of PCIe switches 710 and thus a corresponding PCIe fabric. Control plane 900 provides for secure and encrypted transfer of status/telemetry and command/control signaling into and out of chassis 601 over ports 915. Control plane 900 comprises an Ethernet-based control plane in this example, and a PCIe based example is shown in FIG. 10. Control plane 900 can control the operations and configurations of a PCIe fabric formed from a plurality of PCIe switches, shown in FIGS. 7 and 9 as comprising PCIe switches 710. Control plane 900 comprises controller 711 which communicates over control link 713 to Ethernet switch 912 and Ethernet physical layer circuitry (PHY) 914 over links 716 (617). Furthermore, controller 711 can communicate over link 616 to power control elements (not shown in FIG. 9). Ethernet PHY 914 provides at least two Ethernet ports 915 for coupling to Ethernet cabling, such as category-5, 5e, 6, or other suitable types of Ethernet cabling (both conductive and optical) that provide gigabit-class speeds or higher. Link 713 communicatively couples controller 711 to Ethernet switch 912 using a version of Ethernet signaling referred to as Serial Gigabit Media Independent Interface (SGMII) which provides for on-board chip-to-chip communications using Ethernet compatible signaling without the use of cabling or associated PHY circuitry.

Ethernet switch 912 comprises a multi-port switch arrangement to communicatively couple controller 711 to management interfaces of each of PCIe switches 710 over associated links 913 (613). Links 913 comprise reduced gigabit media-independent interface (RGMII) in this example, which provides for on-board chip-to-chip communications using Ethernet compatible signaling without the use of cabling or associated PHY circuitry. Each of PCIe switches 710 includes a management port compatible with RGMII communications and allows for control of the various operations of PCIe switches 710. For example, assignment and allocation of ports of PCIe switches 710 can be controlled over links 913 to form sets of ports 614 that are grouped together to form compute units with connected physical computing components. Each of the PCIe links 614 shown in FIG. 9 may comprise x16 PCIe links, although other configurations of lanes can be employed. Control signaling to control such operations of PCIe switches 710 can be received over Ethernet ports 915 for delivery to controller 711 or can be originated by controller 711, among other sources. Controller 711 might interpret signaling or messaging received over link 716 to determine control signaling specific to PCIe switches 710 using links 713, 913 to interface with and control configurations of PCIe switches 710. Moreover, PCIe switches 710 can provide status, telemetry, and other messaging to controller 711 over similar interfaces/links. Controller 711 can act on such telemetry/messaging or pass along to further systems over links 716.

FIG. 10 is a diagram illustrating control plane 1000 for a communication fabric in an implementation. Control plane 1000 provides for sideband PCIe control over the operation of PCIe switches 710 and thus a corresponding PCIe fabric. Control plane 1000 provides for secure and encrypted transfer of status/telemetry and command/control signaling into and out of chassis 601 over ports 915. Additionally, external PCIe ports/links 1010 are provided in control plane 1000 which can provide similar features as ports 915. Control plane 1000 comprises a PCIe-based control plane in this example. Control plane 1000 can control the operations and configurations of a PCIe fabric formed from a plurality of PCIe switches, shown in FIGS. 7 and 10 as comprising PCIe switches 710. Control plane 1000 comprises controller 711 which communicates over control link 713 to management PCIe switch 912 and Ethernet physical layer circuitry (PHY) 914 over links 716 (617). Furthermore, controller 711 can communicate over link 616 to power control elements (not shown in FIG. 10). Ethernet PHY 914 provides at least two Ethernet ports 915 for coupling to Ethernet cabling, such as category-5, 5e, 6, or other suitable types of Ethernet cabling (both conductive and optical) that provide gigabit-class speeds or higher. Link 713 communicatively couples controller 711 to management PCIe switch 912 using x1 PCIe links, although other PCIe widths are possible. An M.2 storage unit 1020 may be coupled to management PCIe switch 912, through which it may be accessed by controller 711 over link 713. In an example, the M.2 storage unit 1020 may provide a local cache or memory for management or telemetry data.

Management PCIe switch 912 comprises a multi-port PCIe switch, similar in configuration as PCIe switches 710, but configured in a x1 link width arrangement to communicatively couple controller 711 to management interfaces of each of PCIe switches 710 over associated links 1013 (613). Links 1013 comprise x1 PCIe links in this example. Each of PCIe switches 710 includes a management port compatible with PCIe communications and allows for control of the various operations of PCIe switches 710. For example, assignment and allocation of ports of PCIe switches 710 can be controlled over links 1013 to form sets of ports 614 that are grouped together to form compute units with connected physical computing components. Each of the PCIe links 614 shown in FIG. 10 may comprise x16 PCIe links, although other configurations of lanes can be employed. Control signaling to control such operations of PCIe switches 710 can be received over Ethernet ports 915 for delivery to controller 711 or can be originated by controller 711, among other sources. Controller 711 might interpret signaling or messaging received over link 716 to determine control signaling specific to PCIe switches 710 using links 713, 1013 to interface with and control configurations of PCIe switches 710. Moreover, PCIe switches 710 can provide status, telemetry, and other messaging to controller 711 over similar interfaces/links. Controller 711 can act on such telemetry/messaging or pass along to further systems over links 716. Additionally, external PCIe ports/links 1010 are provided in control plane 1000 to provide similar features/functionality as ports/links 915, but over PCIe style of links instead of Ethernet.

In the arrangement shown in FIG. 10, out-of-band control and telemetry can be carried over Ethernet signaling over links 716, and orchestration of compute unit formation via port configuration of PCIe switches 710 can be controlled over links 717. The PCIe based control plane of FIG. 10 enables flexibility to manage each individual PCIe switch 710 via controller 711 (internal to chassis 601) or via external management nodes coupled over PCIe and links 717.

FIG. 11 is a block diagram illustrating an implementation of control system 1100. Control system 1100 illustrates an example of any of the control systems, controllers, or management processors discussed herein, such as control system 611 of FIG. 6, controller 711 of FIGS. 7, 9, and 10, or power controller 621 of FIGS. 6 and 8. Control system 1100 includes communication interface(s) 1101, user interface 1103, and processing system 1110. Processing system 1110 includes processing circuitry 1111 and data storage system 1112 which can include random access memory (RAM) 1113, although additional or different configurations of elements can be included.

Processing circuitry 1111 can be implemented within a single processing device but can also be distributed across multiple processing devices or sub-systems that cooperate in executing program instructions. Examples of processing circuitry 1111 include general purpose central processing units, microprocessors, application specific processors, and logic devices, as well as any other type of processing device. In some examples, processing circuitry 1111 includes physically distributed processing devices, such as cloud computing systems.

Communication interface 1101 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, I2C interfaces, universal serial bus (USB) interfaces, SMBus interfaces, PMBus interfaces, UART interfaces, wireless interfaces, or one or more local or wide area network communication interfaces which can communicate over Ethernet, Ethernet-style, or Internet protocol (IP) links. Communication interface 1101 can include network interfaces configured to communicate using one or more network addresses, which can be associated with different network links. Examples of communication interface 1101 include network interface card equipment, transceivers, modems, and other communication circuitry. Communication interface 1101 can communicate with elements of a PCIe fabric or other communication fabric to establish logical partitioning within the fabric, such as over an administrative or control interface of one or more communication switches of the communication fabric.

User interface 1103 may include a touchscreen, keyboard, mouse, voice input device, audio input device, or other touch input device for receiving input from a user. Output devices such as a display, speakers, web interfaces, terminal interfaces, and other types of output devices may also be included in user interface 1103. User interface 1103 can provide output and receive input over a network interface, such as communication interface 1101. In network examples, user interface 1103 might packetize display or graphics data for remote display by a display system or computing system coupled over one or more network interfaces. Physical or logical elements of user interface 1103 can provide alerts or visual outputs to users or other operators. User interface 1103 may also include associated user interface software 1121 executable by processing system 1110 in support of the various user input and output devices discussed above. Separately or in conjunction with each other and other hardware and software elements, the user interface software 1121 and user interface devices 1103 may support a graphical user interface, a natural user interface, or any other type of user interface. An example of a physical user interface 1103 may be status display 130 of FIGS. 1, 2, and 4, or front panel display 650 of FIGS. 6 and 7. However, user interface 1103 can also be presented as a software-based interface such as a graphical user interface (GUI) that may be presented at chassis 601 or via a remote host or client device.

User interface 1103 can present a graphical user interface (GUI) to one or more users. The GUI can be employed by end users or administrators to establish clusters, assign assets (compute units/machines) to each cluster. In some examples, the GUI or other portions of user interface 1103 provides an interface to allow an end user to determine one or more compute unit templates and dynamic adjustment policy sets to use or customize for use in creation of compute units. User interface 1103 can be employed to manage, select, and alter machine templates or alter policies for compute units. User interface 1103 also can provide telemetry information, such as in one or more status interfaces or status views. The state of various components or elements can be monitored through user interface 1103, such as processor/CPU state, network state, storage unit state, PCIe element state, among others. Various performance metrics, error statuses can be monitored using user interface 1103. User interface 1103 can provide other user interfaces than a GUI, such as command line interfaces (CLIs), application programming interfaces (APIs), or other interfaces. Portions of user interface 1103 can be provided over a Web Socket based interface. User interface 1103 can provide or control physical indicator lights, such as those discussed herein, or provide status/information/control over one or more front-panel displays on a chassis or enclosure-mounted display.

Storage system 1112 and RAM 1113 together can comprise a non-transitory data storage system, although variations are possible. Storage system 1112 and RAM 1113 can each comprise any storage media readable by processing circuitry 1111 and capable of storing software and OS images. RAM 1113 can include volatile and nonvolatile, removable and non-removable media implemented in any method or technology for storage of information, such as computer readable instructions, data structures, program modules, or other data. Storage system 1112 can include non-volatile storage media, such as solid-state storage media, flash memory, phase change memory, or magnetic memory, including combinations thereof. Storage system 1112 and RAM 1113 can each be implemented as a single storage device but can also be implemented across multiple storage devices or sub-systems. Storage system 1112 and RAM 1113 can each comprise additional elements, such as controllers, capable of communicating with processing circuitry 1111.

Software or data stored on or in storage system 1112 or RAM 1113 can comprise computer program instructions, firmware, or some other form of machine-readable processing instructions having processes that when executed a processing system direct control system 1100 to operate as described herein. Software 1120 illustrates a detailed view of an example configuration of storage 1112 or RAM 1113. It should be understood that different configurations are possible. Software 1120 includes applications 1125 and operating system (OS) 1126. Software applications each comprise executable instructions which can be executed by control system 1100 for operating a computing system or cluster controller or operating other circuitry according to the operations discussed herein.

For example, software 1120 can drive control system 1100 to receive user commands to establish compute units among a plurality of disaggregated physical computing components that include CPUs, GPUs, SSDs, and NICs, among other components. These components comprise any component inserted into a PCIe peripheral slot or PCIe-based storage drive connector discussed herein. Software 1120 can drive control system 1100 to receive and monitor telemetry data, statistical information, operational data, and other data to provide telemetry to users and alter operation of compute units according to the telemetry data, policies, or other data and criteria. Software 1120 can drive control system 1100 to manage cluster resources and compute unit resources, establish domain partitioning or NT partitioning among communication fabric elements, and interface with individual communication switches to control operation of such communication switches, among other operations. The software 1120 can also include user software applications, application programming interfaces (APIs), or user interfaces 1121. The software 1120 can be implemented as a single application or as multiple applications. In general, the software 1120 can, when loaded into a processing system 1110 and executed, transform the processing system from a general-purpose device into a special-purpose device customized as described herein.

Control plane interface 1122 provides communication among other control system 1100 elements, such as over I2C, SMBus, PMBus, discrete logic signaling, Ethernet, emulated network devices, or PCIe interfaces. Control plane interface 1122 enables communications between control system 1100, control plane circuitry, and power control circuitry, as well as other elements. Fabric interface 1123 communicates with management/control interfaces of PCIe switch circuitry and establishes various logical partitioning or domains among communication fabric circuit elements, such as PCIe switch elements of a PCIe fabric. Fabric interface 1123 also controls operation of fabric switch elements, and receives telemetry from fabric switch elements. Fabric interface 1123 also establishes address traps or address redirection functions within a communication fabric. Fabric interface 1123 can interface with one or more fabric switch circuitry elements to establish address ranges which are monitored and redirected, thus forming address traps in the communication fabric.

In addition to software 1120, other data 1130 can be stored by storage system 1112 and RAM 1113. Data 1130 can comprise telemetry agents 1134, telemetry data 1135, and fabric data 1136. Telemetry agents 1134 can include software elements which can be deployed to components in compute units for monitoring the operations of compute units. Telemetry agents 1134 can include hardware/software parameters, telemetry device addressing, or other information used for interfacing with monitoring elements, such as IPMI-compliant hardware/software of compute units and communication fabrics. Telemetry data 1135 comprises a data store of received data from telemetry elements of various compute units, where this received data can include telemetry data or monitored data. Telemetry data 1135 can organize the data into compute unit arrangements, communication fabric arrangements or other structures. Telemetry data 1135 might be cached as data 1130 and subsequently transferred to other elements of a computing system or for use in presentation via user interfaces. Fabric data 1136 includes information and properties of the various communication fabrics that comprise a pool of resources or pool of components, such as fabric type, protocol version, technology descriptors, header requirements, addressing information, and other data. Fabric data 1136 might include relations between components and the specific fabrics through which the components connect.

Power control can also be achieved with control system 1100, such as that found in power controller 621. Power control 1124 provides for control algorithms and schemes which provide for monitoring of PCIe slot power, initiating status indicators to various user interface elements associated with PCIe slots and associated chassis, and control over slot power, among other operations. Power telemetry 1137 can store status of chassis power and slot power for individual peripheral slots, indicating current consumption, power on/off status, and card insertion status. Based on this status, power control 1124 can alter power on/off status for individual peripheral slots or chassis internal circuit boards, as well as provide for control over power indicator lights/LEDs or front-panel displays (if employed). Furthermore, web interfaces, terminal interfaces, APIs, or command-line interfaces can be provided by power control 1124 to send/receive power status/control to external systems, as described by user interface 1103.

Software 1120 can reside in RAM 1113 during execution and operation of control system 1100, and can reside in non-volatile portions of storage system 1112 during a powered-off state, among other locations and states. Software 1120 can be loaded into RAM 1113 during a startup or boot procedure as described for computer operating systems and applications. Software 1120 can receive user input through user interface 1103. This user input can include user commands, as well as other input, including combinations thereof.

Storage system 1112 can comprise flash memory such as NAND flash or NOR flash memory, phase change memory, magnetic memory, among other solid-state storage technologies. As shown in FIG. 11, storage system 1112 includes software 1120. As described above, software 1120 can be in a non-volatile storage space for applications and OS during a powered-down state of control system 1100, among other operating software.

Control system 1100 is generally intended to represent a computing system with which at least software 1120 is deployed and executed in order to render or otherwise implement the operations described herein. However, control system 1100 can also represent any computing system on which at least software 1120 can be staged and from where software 1120 can be distributed, transported, downloaded, or otherwise provided to yet another computing system for deployment and execution, or yet additional distribution.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
    a chassis configured to mount into a server rack, including:
        expansion card slots;
        status lights, each status light corresponding to one of the expansion card slots, configured to provide indications of operational status for a peripheral card inserted into an associated expansion card slot;
        communication switch circuitry including at least three communication switch elements, the communication switch circuitry configured to couple the expansion card slots;
        power control circuitry configured to provide hot swap capability for slot power and auxiliary power of the expansion card slots, such that a selected expansion card slot can have the slot power and the auxiliary power concurrently disabled before removal of an inserted expansion card while remaining ones of the expansion card slots have the slot power and the auxiliary power enabled; and wherein the slot power is provided through the expansion card slots and the auxiliary power is provided at different connections than the slot power and having different voltage levels than the slot power.

2. The apparatus of claim 1, further comprising:
the communication switch circuitry configured to establish peer-to-peer arrangements among any of the expansion card slots to provide for data transfer among corresponding peripheral cards inserted into the expansion card slots without transferring the data through a root complex or host device.

3. The apparatus of claim 1, further comprising:
the chassis further including a control system having a first link coupled to the communication switch circuitry, wherein the control system is configured to control the communication switch elements to manage routing of signals to and from ports of the ports of the communication switch elements.

4. The apparatus of claim 3, further comprising:
the control system further includes a second link coupled to an external control port, wherein the control system is configured to manage the routing of signals based on messaging received from an external agent via the second link.

5. The apparatus of claim 3, further comprising:
the control system is further configured to manage the routing of signals to logically define compute units on-the-fly, the compute units comprising selected ones of the expansion card slots, with the expansion card slots of the compute unit logically isolated from expansion card slots not included in the compute unit.

6. The apparatus of claim 1, further comprising:
a first portion of ports on each of the three communication switch elements is coupled to corresponding expansion card slots;
a second portion of the ports on each of the three communication switch elements is coupled to external ports of the chassis; and
a third portion of the ports on each of the three communication switch elements is coupled to at least another among the three communication switch elements; and
external ports on the chassis communicatively coupled to the expansion card slots through the communication switch circuitry.

7. The apparatus of claim 6,
wherein the power control circuitry is configured to individually control power distribution to each of the expansion card slots by concurrently enabling or disabling both the slot power and the auxiliary power to the selected expansion card slot.

8. The apparatus of claim 1, further comprising:
a front display panel on the chassis configured to provide text-based status indicators.

9. The apparatus of claim 1, further comprising:
the chassis including an opening on a front panel of the chassis; and
the status lights situated in an interior of the chassis and visible external to the chassis through the opening.

10. The apparatus of claim 1, further comprising:
the operational status for a peripheral card includes an error status.

11. The apparatus of claim 1, further comprising:
the operational status for a peripheral card includes a power status.

12. A method, comprising:
providing expansion card slots within a chassis;
providing status lights for each slot configured to provide indications of operational status for peripheral cards inserted into associated expansion card slots;
coupling the expansion card slots via communication switch circuitry;
providing power control circuitry configured to establish hot swap capability for slot power and auxiliary power of the expansion card slots, such that a selected expansion card slot can have the slot power and the auxiliary power concurrently disabled before removal of an inserted expansion card while remaining ones of the expansion card slots have the slot power and the auxiliary power enabled; and
wherein the slot power is provided through the expansion card slots and the auxiliary power is provided at different connections than the slot power and having different voltage levels than the slot power.

13. The method of claim 12, further comprising:
in the communication switch circuitry, establishing peer-to-peer arrangements among any of the expansion card slots to provide for data transfer among corresponding peripheral cards inserted into the expansion card slots without transferring the data through a root complex or host device.

14. The method of claim 12, further comprising:
providing a control system within the chassis having a first link coupled to the communication switch circuitry and a second link coupled to an external control port;
controlling, via the control system based on messaging from an external agent over the second link, the communication switch elements to manage routing of signals to and from ports of the communication switch elements.

15. The method of claim 14, further comprising:
managing, via the control system, the routing of signals to logically define compute units on-the-fly, the compute units comprising selected ones of the expansion card slots, with the expansion card slots of the compute unit logically isolated from expansion card slots not included in the compute unit.

16. The method of claim 12, further comprising:
providing a plurality of external ports on the chassis communicatively coupled to the expansion card slots through the communication switch circuitry;
wherein the communication switch circuitry includes at least three communication switch elements;
wherein a first portion of ports on each of the three communication switch elements is coupled to corresponding expansion card slots;
wherein a second portion of the ports on each of the three communication switch elements is coupled to external ports of the chassis; and
wherein a third portion of the ports on each of the three communication switch elements is coupled to at least another among the three communication switch elements.

17. The method of claim 16, further comprising:
individually controlling, via the power control circuitry, power distribution to each of the expansion card slots by concurrently enabling or disabling both the slot power and the auxiliary power to the selected expansion card slot.

18. The method of claim 16, further comprising:
controlling, via the power control circuitry, the status lights to provide the indications of the operational status for the peripheral cards inserted into the associated expansion card slots, including indications of an error status and indication of a power status.

19. The method of claim 12, further comprising:
providing a front display panel on the chassis configured to provide text-based status indicators.

20. The method of claim 12, further comprising:
providing an opening on a front panel of the chassis, wherein the status lights are situated in an interior of the chassis and visible external to the chassis through the opening.

\* \* \* \* \*